United States Patent
Sieber

(10) Patent No.: US 7,685,727 B2
(45) Date of Patent: Mar. 30, 2010

(54) MEASURING DEVICE FOR GARMENT TAILORING, AND RELATED METHODS

(76) Inventor: Stephen C. Sieber, 3724 Angelton Ct., Burtonsville, MD (US) 20866

( * ) Notice: Subject to any disclaimer, the term of this patent is extended or adjusted under 35 U.S.C. 154(b) by 0 days.

(21) Appl. No.: 11/878,753

(22) Filed: Jul. 26, 2007

(65) Prior Publication Data

US 2008/0184575 A1 Aug. 7, 2008

Related U.S. Application Data

(63) Continuation-in-part of application No. 11/138,260, filed on May 27, 2005, now Pat. No. 7,249,423.

(51) Int. Cl.
*A61B 5/103* (2006.01)
*G01B 1/00* (2006.01)

(52) U.S. Cl. .............. 33/512; 33/3 C; 33/755

(58) Field of Classification Search ........... 33/511–512, 33/3 C, 755–756, 759, 2 R, 4–5, 11, 14–16, 33/23.09, 555.1
See application file for complete search history.

(56) References Cited

U.S. PATENT DOCUMENTS

| | | | |
|---|---|---|---|
| 4,742 A | 9/1846 | Acton | |
| 167,957 A | 9/1875 | Ullrich | |
| 460,282 A | 9/1891 | Smith | |
| 650,389 A | 5/1900 | Hatfield | |
| 734,279 A | 7/1903 | O'Donnell et al. | |
| 740,943 A | 10/1903 | Summersby et al. | |
| 846,461 A | 3/1907 | Engel | |
| 988,683 A | 4/1911 | Wurtzel | |
| 991,103 A | 5/1911 | Titchell | |
| 1,079,333 A | 11/1913 | Goldberger | |
| 1,096,975 A | 5/1914 | Watters | |
| 1,248,035 A | 11/1917 | Taylor | |
| 1,262,376 A | 4/1918 | Moyer | |
| 1,339,896 A | 5/1920 | Kemper | |
| 1,414,481 A | 5/1922 | Moe | |
| 1,521,054 A | 12/1924 | Sniegocki | |
| 1,784,888 A | 12/1930 | Couture | |
| 2,199,530 A | 5/1940 | Thompson | |
| 2,205,626 A | 6/1940 | Mason | |
| 3,405,852 A | 10/1968 | Fox | |
| 3,685,155 A | 8/1972 | Oblander | |
| 4,635,367 A | 1/1987 | Vigede | |
| 4,651,427 A | 3/1987 | Perry | |
| 4,730,646 A | 3/1988 | Traub | |
| 4,868,990 A | 9/1989 | Steinberg | |
| 4,875,296 A | 10/1989 | Holzmeister et al. | |
| 5,062,215 A * | 11/1991 | Schlitt ..................... 33/755 |
| 5,732,475 A | 3/1998 | Sacks et al. | |
| 6,401,350 B2 | 6/2002 | Ford | |
| D478,519 S * | 8/2003 | Black ..................... D10/71 |
| 6,640,460 B1 | 11/2003 | Nabarro et al. | |

(Continued)

*Primary Examiner*—Yaritza Guadalupe-McCall
(74) *Attorney, Agent, or Firm*—Berenato & White, LLC

(57) ABSTRACT

A measuring device is provided for use in the preparation of custom garments. According to one embodiment, the device includes a flexible belt capable of being encircled about a body part of an individual, and a strap attachable fixedly to the belt. One or both of the belt and strap may be formed as closed continuous loops by molded brackets/blocks formed on the belt and strap. The belt and strap each contain a respective scale of measurement indicia. Also provided are several methods for utilizing the measuring device.

13 Claims, 12 Drawing Sheets

U.S. PATENT DOCUMENTS

D503,637 S * 4/2005 Noel .......................... D10/71
D555,020 S * 11/2007 Hesch ......................... D10/72

2002/0166254 A1   11/2002  Liebermann

* cited by examiner

MEASURING DEVICE FOR GARMENT TAILORING, AND RELATED METHODS

This application is a Continuation-in-part of U.S. patent application Ser. No. 11/138,260, filed May 27, 2005, now U.S. Pat. No. 7,249,423, the disclosure of which is hereby incorporated by reference.

FIELD OF THE INVENTION

The present invention relates to the field of garment preparation, and more particularly to the field of custom garment tailoring.

BACKGROUND OF THE INVENTION

Most consumer garments are made available for purchase in ready-to-wear stock sizes, for example, at retail outlets such as department or specialty stores. Consumers typically travel to one or more stores to estimate their garment size, then proceed through a trial-and-error process of trying on garments of different sizes close to their estimate until arriving at a size that fits best. While this process permits most people to obtain garments that overall fit well enough to wear, depending upon eccentricities in the body of the wearer a garment may properly fit one body part while improperly fitting another body part. For example, traditional dress shirts such as used for men's business attire are often available by neck size and arm length. However, discrepancies in shoulder broadness and girth, even between individuals sharing common neck sizes and sleeve lengths, can result in the shirt properly fitting a first individual and not fitting a second individual.

Currently available stock sized garments often present additional drawbacks. Although most manufacturers adopt standard numbered sizes or more subjective designations such as small, medium, large, etc., there can be a wide variation in the actual "size" of a garment produced by one manufacturer when compared to that of another. As a result, people frequently find that although a certain size of garment fits them when produced by one manufacturer, they require a different size when purchasing garments made from a different manufacturer.

Manufacturers have contributed to this problem by frequently introducing different lines of clothing under a single label or brand that purportedly are aimed at different classes of purchasers such as younger individuals versus older individuals or those of smaller or larger stature as compared to those of so-called normal stature. In such instances, although manufacturers retain traditional size designations such as medium, etc., the garments so designated from one line fit and are dimensioned differently than those from another line. Manufacturers routinely offer little or no clue to the consumer as to these differences other than occasional use of highly subjective terms such as sport, athletic, junior or petite to indicate such size differences. It is not uncommon, therefore, for consumers to be somewhat perplexed or exasperated as they find that a garment from a particular manufacturer that bears "their" size does not fit them only to be told by a salesperson that despite the size designations on the garment, that the garment is from a particular line of that manufacturer that runs bigger or smaller.

These problems are compounded by the fact that pricing pressures in the retail marketplace require many garments to be produced faster than in the past and/or under less stringent garment to garment quality control standards. The consistency and, therefore, reliability of size designations even for garments of a designated size from the same producer have suffered. It is not uncommon, for example, to find a variance of up to an inch or more in the waistband or length of jeans from a single manufacturer that purports to be the same size and style. All these trends have resulted in increased consumer confusion and dissatisfaction as they are forced to deal with the hidden intricacies of what are supposed to be ready-to-wear stock sizes to the potential detriment of clothing manufacturer's sales figures.

The current problems that proliferate so-called ready-to-wear stock size garments are further compounded by the popularity of the use of the internet for clothing purchases and current fashion trends. It has become commonplace for consumers to try to save time and effort by using the internet as a shopping tool rather than traveling to retail locations. This trend has included shopping for clothing. While the internet can provide many pictures of clothing and verbal descriptions of how a garment may fit, consumers will not get a true idea of the fit of the garment until they purchase it, receive it and try it on.

The problems with existing stock-sized garments have led many internet shoppers to only be willing to consider purchasing garments over the internet from manufacturers or manufacturer's style lines that they already own, neglecting to consider either other manufacturers or styles. This consumer behavior presupposes that a given manufacturer does not change the cut or sizing of its garments in general or of a particular style line, which frequently is not the case. The verbiage and charts frequently offered on web sites to help a customer determine the appropriate size to purchase usually have no effect since consumers lacking tailoring experience usually do not bother to go through a complete measurement before they make a purchase of clothing or they are confused or daunted by the task of attempting to decipher the directions to determine their size.

At a minimum, these problems associated with internet clothing shopping can result increase in frustration and wasted time and expense as a consumer has to send purchases back one or more times to the manufacturer in favor of a different size until this trial and error process hopefully results in obtaining an appropriately fitting garment. If the consumer's level of frustration is higher, this process may lead to a consumer, who might have been a loyal customer of a given brand, to either no longer shop for clothing via the internet or no longer continue their purchases from that particular manufacturer.

Current fashion trends further exacerbate the problems associated with so-called stock-size garments. Stock sizes impair the ability of consumers to obtain a garment that appropriately fits their particular anatomy in a way in which they desire. The variability in the look, style and fit of clothing has continued to vary over a wide spectrum. Fashion trends have caused clothing styles to run the gamut from extremely oversized garments to virtually skin-tight form-fitting garments. Some fashion styles dictate a tight fit in one area of a garment and a loose fit in another.

These realities have made sizing designations further unreliable. For example, a consumer may desire extremely high or low rise for a pair of pants or jeans to accomplish a given style or look. This can cause the waistband of the garment, for example, to end up riding either across or very low on the hips in one instance to other instances where they are above or very high on the hips in another. Similarly, the purchaser of such garments may desire the crotch of the garment to very closely follow the contour of the body or provide a considerable space of up to several inches between the wearer's crotch and the location of the crotch on the garment. These trends have rendered many traditional garment such as the inseam measurement relatively useless since these measurements depend upon the height or location of the waistband on the wearer and the location of the rise. Traditional inseam measurements virtually never represent a standard measurement that is of any use in crafting such varied custom fashion clothing. To a lesser extent, the reliability of crotch outseam and length measurements has also been lessened by these trends since they depend completely upon the location of the waistband in relation to the wearer's hips.

In order to overcome the problems associated with stock-sized garments as set forth above, consumers who are more discerning about their clothing and clothing fit or have unusual requirements in this regard have at times rejected stock-sized items in favor of custom-made garments. A major benefit of custom-made garments is the ability to have them tailored to complement the particular body size and style of the individual. However, custom garments are typically much more expensive than standard or ready-to-wear garments and usually require a extended time period for production of the garment. The extra expense of custom garments stems in part from the fact that production of such garments requires the time and expertise required by a skilled tailor, working with a tape measure, to accurately measure the person for whom the garment is being customized. In addition to the expense, consumer who chooses the custom garment resigns himself to the fact that he can not accomplish the process himself and will need to make one or more trips to a tailor to accomplish the measuring process alone. In return for the additional time and money invested for the custom-made garment, the consumer commonly expects precise fit and pleasing comfort in the tailored clothing. It is, therefore, imperative that the tailor have adequate tools to take precise measurements and to fit the consumer with a garment that meets the consumer's expectations.

Generally, a tailor begins a custom tailoring process by measuring his or her customer to determine various body dimensions for use in production of the custom garment. Typically, this measurement process is performed with a standard measuring tape, which the tailor applies along and around various body parts of the individual. Tailors usually work from certain "standard measurements" such as chest, waist, hip and inseam measurements. These so-called standard measurements, however, are rendered meaningless if the wearer, for example, intends to locate the waistband of the finished garment at a point other than where the tailor has taken his traditional waist measurement.

Another problem associated with this process is that tape measures are made of a different material than the material of the new custom garment and must be held in place by the tailor while the individual being measured remains still to obtain a measurement. Due to the differences in material and dimension, the texture and sensation of a tape measure about the consumer's body part, such as the waistline, are not accurately representative of the visual and tactile sensations that the actual garment material will provide. Tape measures are also usually not capable of staying secured, as a waistband would, without the tailor holding it in place. The finished tailored garment may, therefore, provide the consumer with a significantly different feel and appearance than the consumer anticipated from the measuring tape. As a consequence, even though a finished garment is tailored commensurate with the specifications of the customer using measurements taken with the measuring tape, the consumer may, upon trying on the finished garment learn that the selected material is ill-fitting or uncomfortable to wear.

The differences between the tape measure and the garment material may raise additional problems, especially in the measurement of the waist size and length of pants. Because a measuring tape has a different appearance and feel than the garment material, the consumer often finds it difficult to identify, using the tape measure, the exact height at which he prefers the waistband of the pants on his or her body. Errors in judgment of waistband location by the tailor or consumer during the measurement process are reflected in the tailored garment when the consumer tries on the pants but places the waistband at a different height than originally estimated using the tape measure. Similar problems can result from the fact that the tape measure does not have the same bulk or drape of the garment material when attempting, for example, to obtain accurate crotch or outseam measurements. Such judgment errors, whether attributable to the consumer or tailor, cause the tailor to bear additional time and expense in altering the garment or may even require the garment to be remade. This, of course, serves to increase consumer frustration, delays and expense.

A further problem associated with tailoring using a conventional measuring tape is that the tailoring process involves taking multiple measurements that are interrelated with one another. For example, when measuring for the waistband for a pair of pants, the height on the customer's waist at which the measuring tape is placed will directly affect pants length and crotch measurements, which typically start at the waistband. It is therefore important that pants leg measurement start from the same location where the waistband measurement was taken and not from some standard waist measurement location.

The prior art has attempted, with very limited success, to address some of the aforementioned drawbacks. One such attempt is found in U.S. Pat. No. 1,248,035 to Taylor, which discloses a measuring device comprising a belt that fits about the waist, suspended measuring tapes slidingly engaged to opposite sides of the belt, and a strap slidingly engaged to the rear of the belt.

The measuring device of the Taylor patent has several drawbacks. For example, the loops that engage the tape measures and strap to the belt may be prone to slippage or bending the belt when tensioned thereby compromising the accuracy of measurements. The loops also are not readily detachable from the belt when the belt is encircled about the waist of the user. As a consequence, the measuring device of the Taylor patent has limited convenience, and can be difficult to use in taking certain obstructed measurements accurately, such as front and rear rise. Additionally the buckle of the Taylor patent is substantially the same as a standard belt buckle. As such, it is not infinitely adjustable and is prone to providing inaccurate waist measurements.

The Taylor patent further fails to utilize the material and dimensions of the corresponding portion of the ultimate garment. Additionally, the use and arrangement of multiple measuring strips as depicted in the Taylor patent require the use of different strips for each separate measurement, limit the measuring device to pants fitting, and render the device impractical for measuring for other garments, such as shirts, jackets, and hats.

SUMMARY OF THE INVENTION

It is an object of the present invention to provide measuring devices and methods that address the above-identified problems. This application will focus primarily on the structure of the measuring devices without regarding to the specific body part being measured or the apparel to be applied to the user's body. The measurement devices may measure body parts for garments or for accessories such as watches, hats, etc.

According to the preferred aspect of the invention, there is provided a measurement device, comprising a belt and/or a strap. The belt comprises a flexible belt body capable of being encircled about a body part of an individual to be custom tailored with a garment. The belt body comprises opposite first and second belt faces, the first belt face comprising a first scale of measurement indicia for providing circumference measurements. An end of the strap is attached in a sliding and rotatable manner to the belt body to render the attached strap end movable along the length of the belt, and it may be detachable from and re-attachable to the encircled belt body. The strap comprising a flexible strap body with opposite first and second strap faces, the first strap face may comprise second and third scales of measurement indicia for providing length measurements from a reference point on the belt. The belt preferably comprises a bracket with an aperture through which said belt passes, whereby the second end comprising a locking member having a size that is larger than said aperture such that said second end cannot pass through said aperture, whereby said belt is formed as a first closed loop. Further, the strap may define a second closed loop connected to said belt and remote from said first closed loop. The distal end of the strap comprises a loop bracket having an aperture through which said strap passes to form a second closed loop.

As an additional step in addressing the foregoing objective, and in accordance with the purposes of the invention as embodied and broadly described herein, one aspect of this invention provides a method for measuring an individual for garment tailoring. The method of this aspect comprises selecting a material of which a custom-tailored pants garment is to be prepared for an individual, having a waistband on the garment, and providing a belt for measuring the garment. The belt body has a belt face comprising a scale of measurement indicia. The belt is encircled around a waist area of the individual for whom the custom-tailored garment is to be prepared while positioning the belt at the same height that the individual intends to wear the waistband. A circumferential measurement is registered from the scale for use in preparation of the custom-tailored pants garment.

A method for measuring an individual for garment tailoring according to a second aspect of the invention comprises selecting a material of which a custom-tailored garment is to be prepared for an individual, and providing a garment-tailoring measurement device. A belt of the garment-tailoring measuring device comprises a flexible belt body which may be made of a material simulating the appearance and texture of the material from which the custom-tailored garment is to be prepared. The belt body has a belt face comprising a first scale of measurement indicia. A strap is attachable to the belt body. The strap comprises a flexible strap body having a strap face comprising a second scale of measurement indicia for measuring distance from a reference point on the belt. The belt is encircled around a first body part of the individual for whom the custom-tailored garment is to be prepared and a circumferential measurement from the first scale is registered for use in preparation of the custom-tailored garment. The strap end is attached to the belt and, while retaining the belt encircled around the first body part, a length measurement from the second scale is registered for use in preparation of the custom-tailored garment.

A method for measuring an individual for garment tailoring according to a third aspect of the invention makes use of a garment-tailoring measurement device comprising a belt and a strap. The belt comprises a flexible belt body having a belt face comprising a first scale of measurement indicia. The strap has a strap end attachable fixedly to the belt to render the attached end non-movable along the length of the belt. The strap comprises a flexible strap body having a strap face comprising a second scale of measurement indicia for measuring distance from a reference point on the belt. According to this aspect, the belt is encircled around a first body part of an individual for whom a garment is to be custom tailored and a circumferential first measurement is registered for use in preparation of the custom-tailored garment. The strap end is attached to the belt and, while retaining the belt encircled around the first body part, the attached strap end is positioned at a first circumferential location about the first body part. The strap is extended along a second body part of the individual, and a second measurement from the strap is registered for use in preparation of the custom-tailored garment. The encircled belt is rotated to position the attached strap end at a second circumferential location about the first body part, and the strap is extended along a third body part of the individual, a third measurement from the strap is registered for use in preparation of the custom-tailored garment.

According to a fourth aspect of the invention, a method is provided for measuring an individual for garment tailoring, comprising providing a garment-tailoring measurement device comprising a belt and a strap. The belt comprises a flexible belt body having a belt face comprising a first scale of measurement indicia. The strap has a strap end attachable fixedly to the belt at a pivot joint to render the attached strap end non-movable along the length of the belt. The strap comprises a flexible strap body having a strap face comprising a second scale of measurement indicia for measuring distance from a reference point on the belt. The method of this aspect comprises encircling the belt around a first body part of the individual for whom a garment is to be custom tailored and registering a circumferential first measurement from the first scale use in preparation of the custom-tailored garment. While retaining the belt encircled around the first body part, the attached strap end is positioned at a circumferential location, the strap is extended along a second body part of the individual, and a second measurement from the second scale is registered for use in preparation of the custom-tailored garment. The method further comprises, while retaining the attached strap end at the circumferential location, pivoting the strap about the pivot joint, extending the strap along a third body part of the individual, and registering a third measurement from the second scale for use in preparation of the custom-tailored garment.

A method for measuring an individual for garment tailoring according to a fifth aspect of the invention comprises providing a garment-tailoring measurement device comprising a belt and a strap. The belt comprises a flexible belt body having a belt face comprising a first scale of measurement indicia. The strap has a strap end attachable fixedly to the belt to render the attached end non-movable along the length of the belt, yet repeatedly detachable from and re-attachable to the belt. The strap comprises a flexible strap body having a strap face comprising a second scale of measurement indicia for measuring distance from a reference point on the belt. According to this aspect, the method further comprises encircling the belt around a first body part of the individual for whom a garment is to be custom tailored and registering a circumferential first measurement from the first scale for use in preparation of the custom-tailored garment. The strap end is attached to the belt and, while retaining the belt encircled around the first body part, the strap is extended along a second body part of the individual and a second measurement is marked on the second scale. Next, the strap end is detached from the encircled belt while retaining the second measurement mark on the second scale, and the second measurement from the second scale is recorded for use in preparation of the custom-tailored garment.

A sixth aspect of the invention provides a method for measuring an individual for garment tailoring, comprising providing a garment-tailoring measurement device comprising a belt and a strap. The belt comprises a flexible belt body having a belt face comprising a first scale of measurement indicia. The strap has a strap end attachable to the belt, the strap comprising a flexible strap body having a strap face with a second scale of measurement indicia for measuring distance from a reference point on the belt. The method further comprises encircling the belt around a waist or hip area of an individual for whom a jacket garment is to be custom tailored, attaching the strap to the belt, and, while retaining the belt encircled around the waist or hip area, extending the strap body up to and optionally over a shoulder of the individual and registering a jacket measurement from the second scale for use in preparation of the custom-tailored jacket.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

Figure 1:
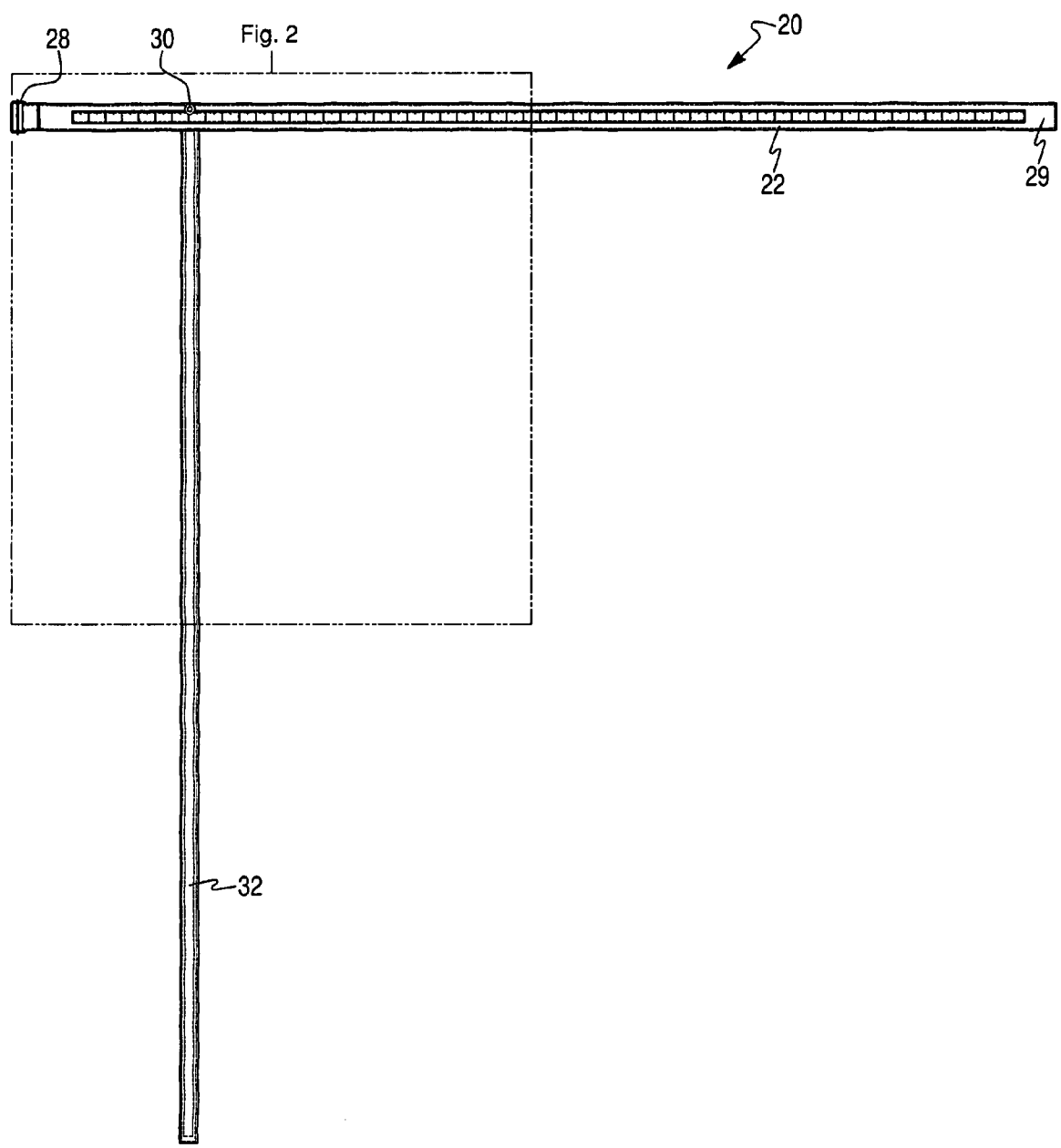
FIG. 1 is a top view of a measuring device according to an embodiment of the invention.

DETAILED DESCRIPTION OF CERTAIN PREFERRED EMBODIMENTS AND METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

Figure 3:
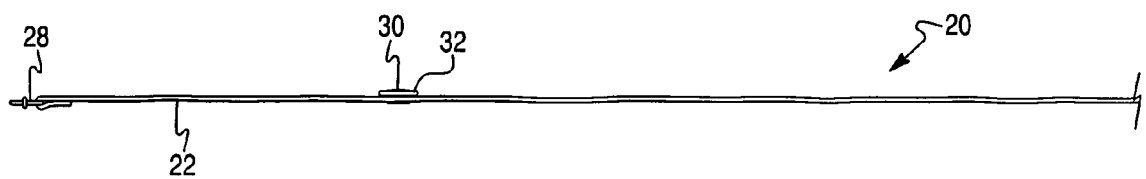
FIG. 3 is an end view of the measuring device of FIG. 1.
Figure 4:
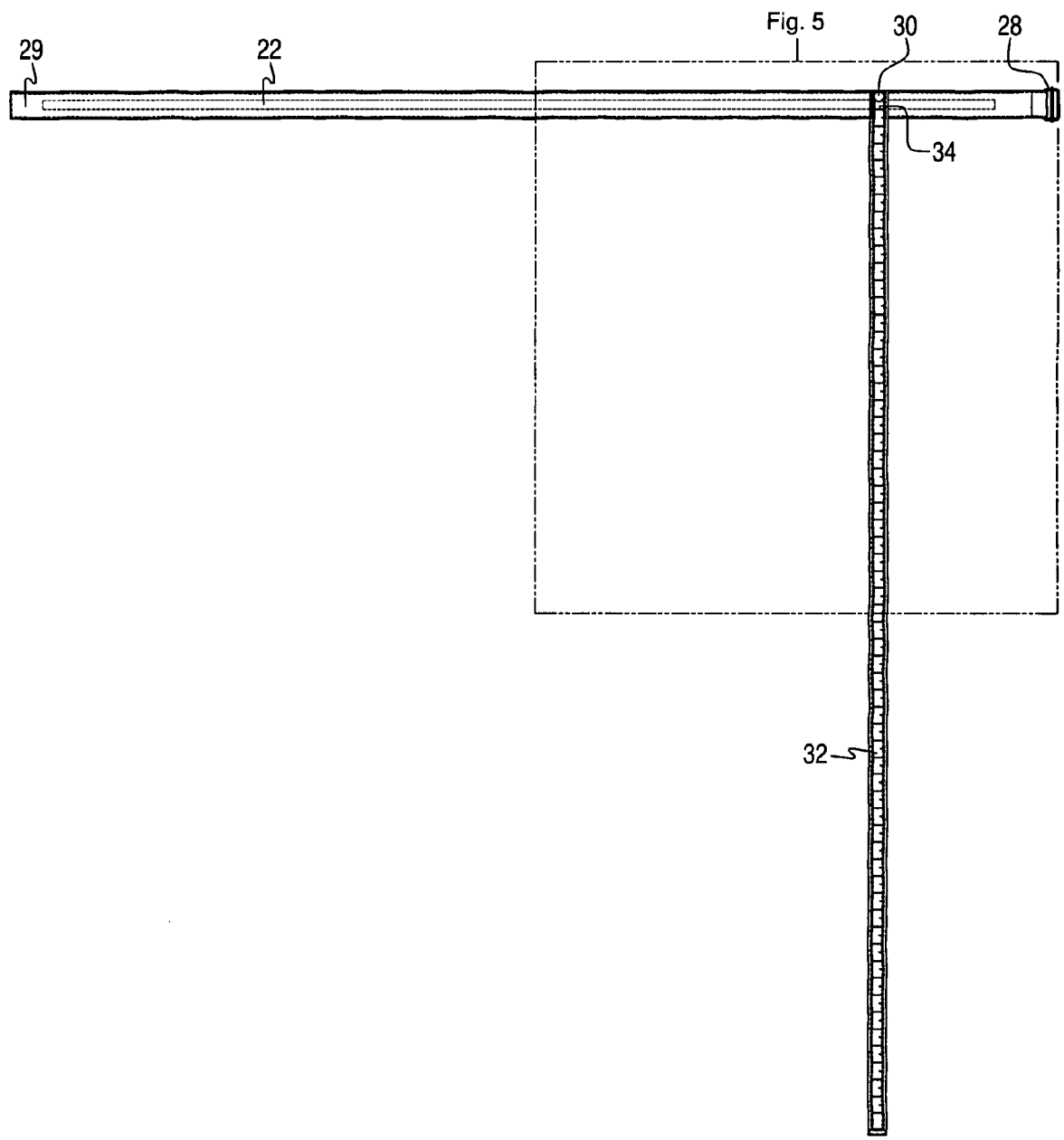
FIG. 4 is bottom view of the measuring device of FIG. 1.

Referring now more particularly to the drawings, a measuring device according to an embodiment of the invention is generally referred to by reference numeral 20 in FIGS. 1, 3, and 4.

Figure 2:
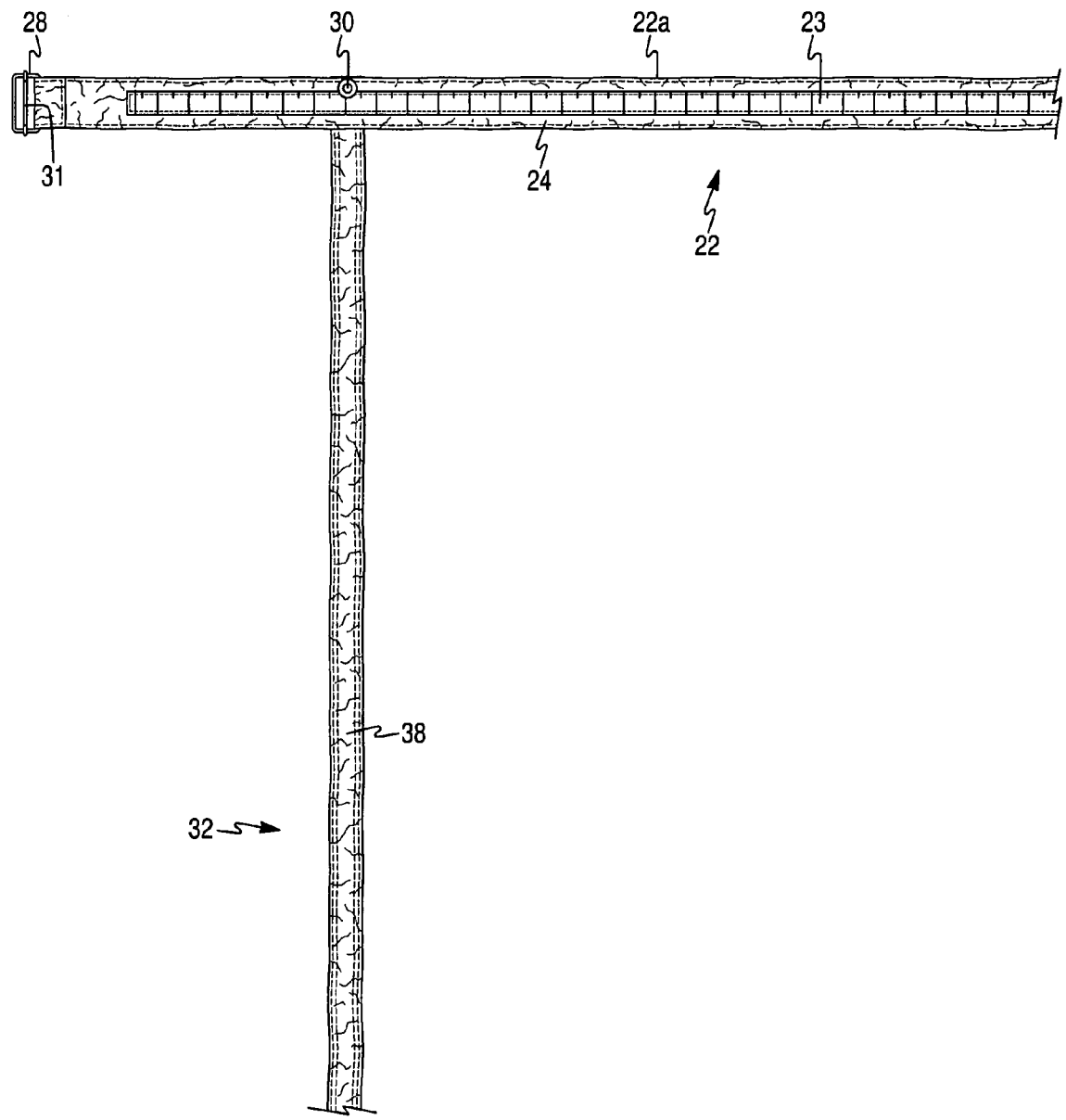
FIG. 2 is an enlargement of a portion of the view depicted in FIG. 1.
Figure 5:
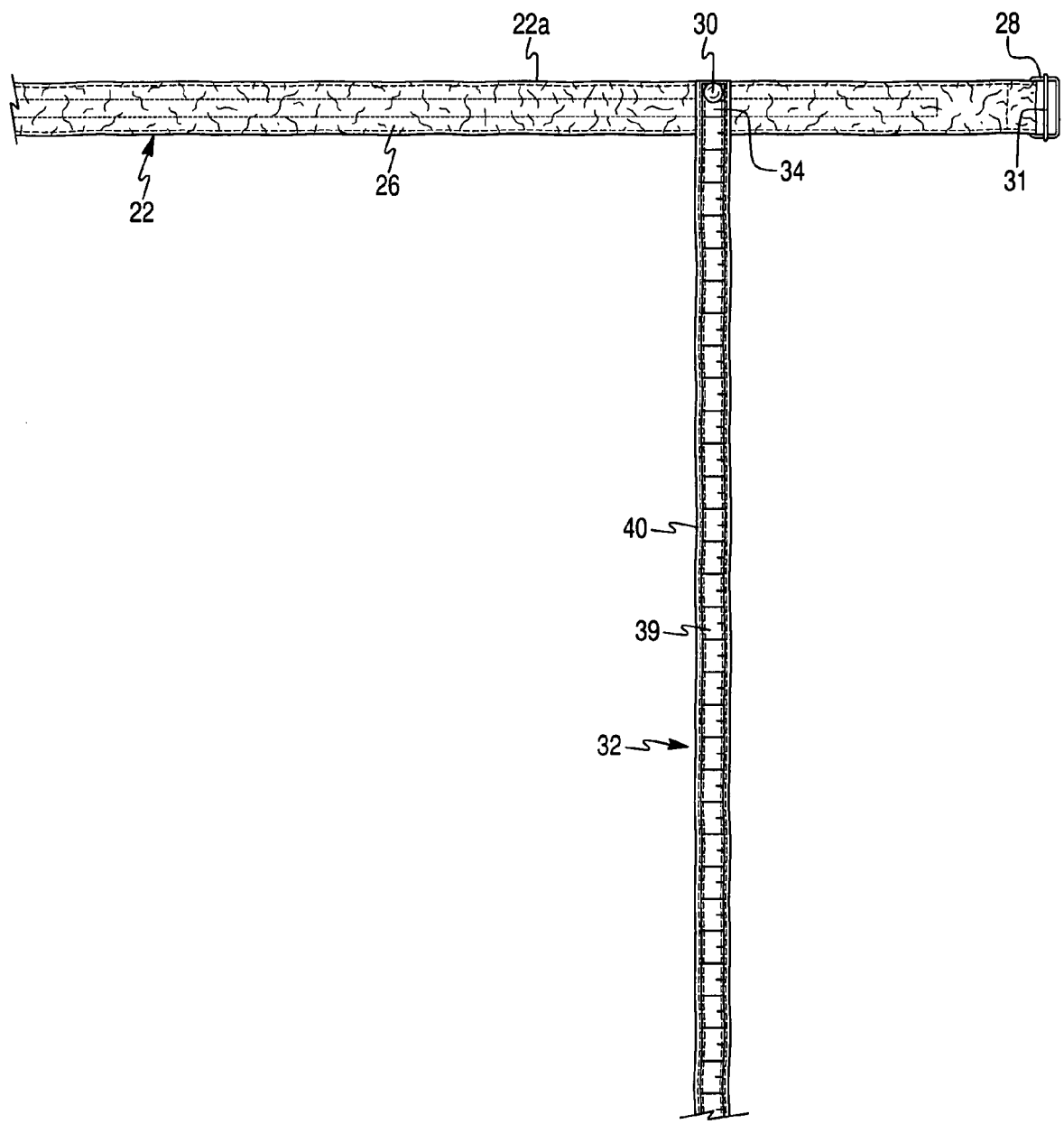
FIG. 5 is an enlargement of a portion of the view depicted in FIG. 4.

Measuring device 20 comprises a belt 22 having a flexible belt body capable of being encircled about a body part of an individual, such as around a waist, neck, chest, arm, thigh, hip and/or head. The belt body has an inner face 24 (FIG. 2) and an opposite face 26 (FIG. 5). A buckle 28 is provided at one end of belt 22, and is sized to permit feeding of the opposite second end 29 of belt 22 through buckle 28. Attachment of buckle 28 to belt 22 may be accomplished in known manners, such as by folding over sewing excess belt length to create a loop securing buckle 28. As discussed in further detail below, belt 22 further comprises a fastener 30, which in the embodied device 20 comprises snap halves.

The inner face 24 has a belt scale 23 of measurement indicia for providing circumference measurements. The scale 23 may comprise a measuring tape, marking strip, etc. attached to, e.g., sewn into, the body of belt 22. Alternatively, the first scale may be embedded, integral with, marked on, or otherwise associated with the belt body. In the illustrated embodiment, the opposite face 26 of the belt body does not include a scale of measurement indicia. It should be understood, however, that it is within the scope of the invention to include a separate scale of measurement indicia on the face 26, and to make the scale of measurement indicia of the face 26 identical to or different from the indicia of the first scale on the inner face 24.

The belt scale 23 is preferably a measurement scale of inches, centimeters, etc., and may be broken down or graduated into smaller units, e.g., eighths of inches, millimeters, etc. Alternatively, the inner scale may comprise a different scale or symbols, such as, for example, indicators for small, medium, large, extra large, or women's sizes (e.g., 2, 4, 6, etc.). These are just examples of measurement indicia that may be used. Preferably, the inner scale of measurement indicia employs the end of buckle 28 as a reference starting point for measuring distance along the belt 22.

Measuring device 20 further comprises a strap 32 having a strap end 34 attached fixedly to the belt body. The fixed attachment is accomplished using fastener 30, which is illustrated in this embodiment positioned in relatively close proximity to buckle 28. In the illustrated embodiment fastener 30 is depicted as a snap pair, i.e., a first half of the snap pair integrated into belt 22 and a second half of snap pair integrated into strap 32. The snap pair fastener 30 fixes the connection between belt 22 and strap 32, inasmuch as fastener 30 render the attached strap end 34 non-slidable along the length of the belt 22.

It should be understood that other types of relative movement between belt 22 and strap 32 are not necessarily restricted by fastener 30. For example, according to one preferred embodiment snap pair fastener 30 creates a pivot point for permitting strap 32 to pivot rotationally about its point of attachment to the belt 22. It should be understood that other types of fasteners may be used in addition to or in place of the depicted snap pair. For example, fastener 30 may comprise Velcro® or other similar commercially available material comprising hook and loop fasteners, buttons, clasps, etc. Fastener 30 is preferably repeatedly detachable from and re-attachable to belt 22 without damage to belt 22 or strap 32 to permit detachment and re-attachment of fastener from belt 22, even when belt 22 is encircled upon itself with the belt second end 29 fed through buckle 28.

Fastener 30 provides additional advantages over prior known constructions. Prior constructions that attach a strap to a belt through a loop-type connection were prone to result in inaccurate measurements since, as the strap was tensioned, it would tend to bend or pull a section of the belt that was looped around out of alignment. With the construction of the fastener 30 of the present invention, if undue tension is applied to the strap that might have a tendency to bend or move the belt 22 out of a true and accurate position or alignment, the fastener 30 can be designed to automatically uncouple the strap 32 from the belt 22 under a pre-selected amount of tension.

Strap 32 has an inner face 38 (FIG. 2) and an opposite outer face 40 (FIG. 5). In the illustrated embodiment, in FIG. 5, outer face 40 features a strap scale 39 of graduated measurement indicia. The attachment of strap end 34 to belt 22 as shown arranges the outer face 40, and hence the scale 39, in an opposite direction (facing away) from the scale 23 on inner face 24 of belt 22. In the illustrated embodiment, the inner face 38 of strap 32 does not include a scale of measurement indicia. It should be understood, however, that it is within the scope of the invention to include a separate scale on the face 38, and to make the measurement indicia of the scale associated with the face 38 identical to or different than the indicia of outer face 40.

The strap scale 39 may be the same as or different from the belt scale 23. The strap scale is preferably a measurement scale of inches, centimeters, etc., and may be broken down or graduated into smaller units, e.g., eighths of inches, millimeters, etc. Alternatively, the strap scale may comprise a different scale or symbols, as long as it enables sizes to be recorded in a way that will provide accurate guidance in the construction of garments for a particular individual, such as, for example, indicators for small, medium, large, extra large, or woman's sizes (e.g., 2, 4, 6, etc.). These are samplings of measurement indicia that may be used.

The strap scale 39 may comprise a measuring tape or other strip sewn into, embedded, or otherwise integrated or otherwise associated with the body of strap 32. Preferably, the strap scale of measurement indicia measures distance from a reference starting point on the belt 22. Preferably, the reference starting point on the belt 22 is an upper edge 22a of belt 22 opposite to the majority of strap 32. It should be understood that second scale need not include continuous markings from the reference starting point. Although the upper edge 22a may serve as the reference starting point of the second scale, an optional gap or omission of measurement indicia can be provided adjacent the reference starting point. For example, in the event that the graduated measurement indicia are set forth in inches, the lowest marked indicia on strap 32 may be, for example, 4 inches representative of a distance of 4 inches from upper edge 22a.

It is preferred to make the belt body, and more preferably both the belt body and the strap body, of a material simulating the appearance, texture of a material from which the custom-tailored garment is to be prepared and/or the dimensions (height and thickness) of the waistband of the finished garment. This construction minimizes distortion of measurements and approximates the feel of the finished garment. For example, if measuring device 20 is to be used in preparation of tailoring a pair of jeans, the main bodies of belt 22 and strap 32 are preferably made of denim that simulates the dimensions, appearance and tactile feel of the waistband and crotch or outseam of the jeans, and more preferably is made of identical denim as selected to make the jeans. Similarly, if measuring device 20 is to be used in preparation of tailoring a cotton shirt, the main bodies of belt 22 and strap 32 are preferably made of cotton. Thus, measuring device 20 may be made of various materials used in tailoring custom garments. A user may be equipped with multiple measuring devices 20 having different dimensions and/or made of different materials from one another, in which case he or she will select the particular device 20 corresponding to the garment material.

Belt 22 is sufficient in length and flexibility to encircle the torso of most human adults. For example, belt 22 may be 3 to 8 feet in length. Strap 32 preferably has similar flexibility, and additionally is sufficient in length to measure the pants leg length or over shoulder torso dimension of an average human adult. For example, strap 32 also may be 3 to 8 feet in length. The respective lengths of belt 22 and strap 32 may be the same or different from one another.

Other modifications and variations in addition to those described above may be made to the illustrated measuring device 20. By way of example, belt 22 may be modified to include a plurality of half-snaps or other fasteners along its length, wherein strap end 34 is capable of mating with belt 22 at any one of multiple positions along the length of the belt body. According to this embodiment, strap 32 is attachable to and detachable from multiple circumferential locations about encircled belt 22. According to a related modification, single-strap measuring device 20 comprises a plurality of straps for mating with the multiple half snaps or other fasteners on belt 22.

Measuring device 20 is suitable for use in measuring both the upper and lower body of a user to provide precise measurements to produce most any custom-tailored garment without requiring use of any other devices or accessories. Measuring device 20 is particularly useful in custom tailoring, for example, pants, jeans, shorts, shirts, jackets, coats, skirts, blouses, dresses, hats and accessories.

Described below are methods for taking various measurements useful in tailoring custom-made lower body garments, such as pants, jeans, shorts, jackets and skirts. These methods are representative and not necessarily exhaustive of the manner in which the embodied measuring device 20 may be used for tailoring purposes.

Waist

The individual who is being measured (or the "measured individual") selects a material of which a custom-tailored pants garment is to be prepared. A belt 24 may be selected that has a flexible belt body made of a material simulating the dimension, appearance and/or tactile feel of the waistband from which the custom-tailored pants garment is to be prepared. Preferably, the belt body is substantially identical in width and thickness to the waistband and may be made of a material which is substantially identical to the material from which the waistband of the custom-tailored pants garment is to be prepared. As a result, the present invention allows the user to approximate the feel of the actual waistband of the finished garment at the exact height that the individual desires to wear the waistband of the finished garment rather than providing a standard waist measurement of an individual that does not correspond to the desired ultimate waistband location of the finished garment.

Figure 6:
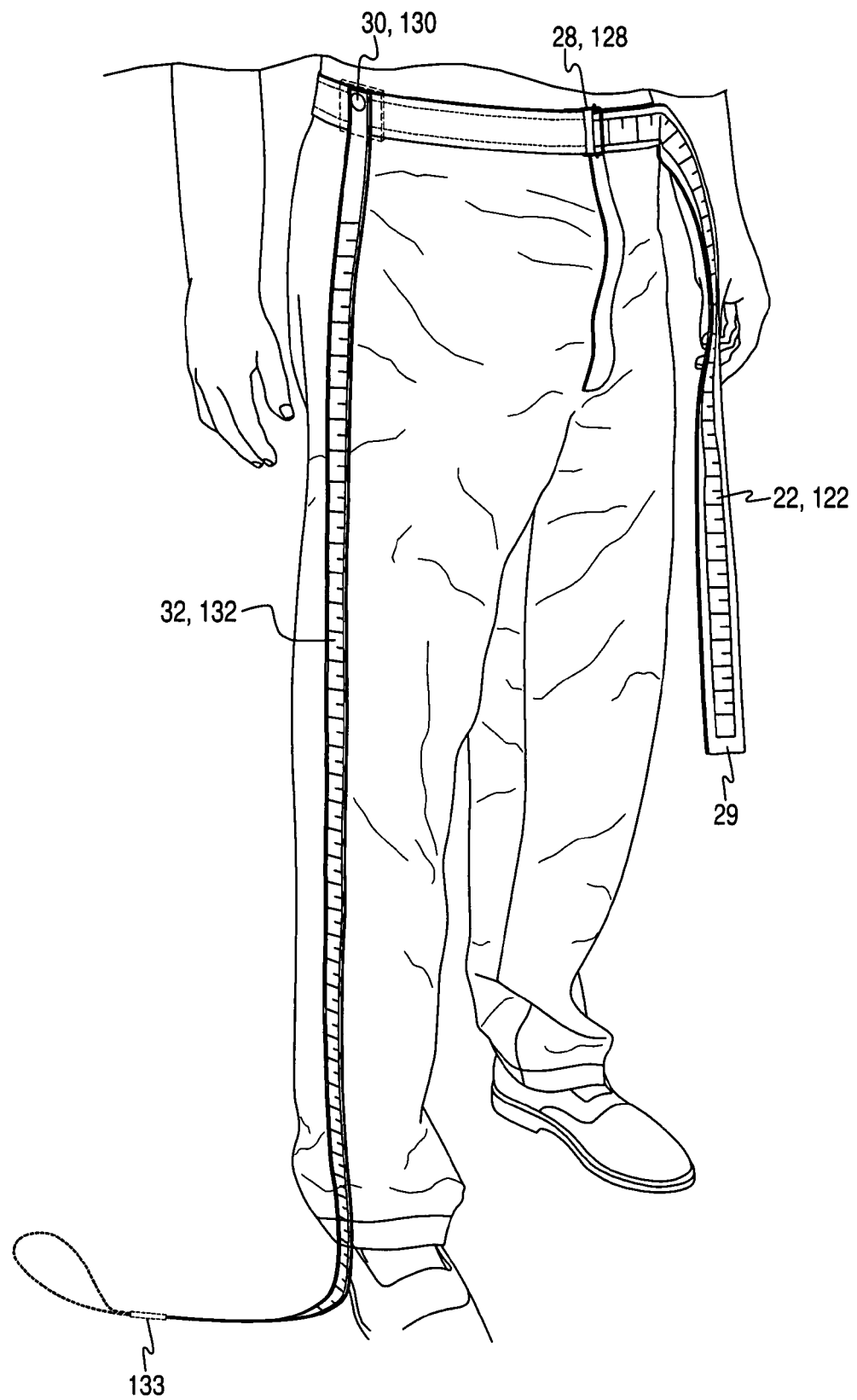
FIG. 6 is a depiction of the measuring device of FIG. 1 applied about the waist for taking waist and pants leg length measurements.

The individual will preferably obtain the measurements using the device when dressed in underwear or a similar form-fitting garment to improve the accuracy of the measurements. To begin, the belt 24 is encircled about the measured individual at the desired vertical location of the waistband of the finished garment, as shown in FIG. 6. Although this step may be performed by the tailor or the tailor's assistant, it is important to note that the measured individual may perform this task himself with equal success. The half snap of belt 22 positioned at upper edge 22a of belt 22 is arranged facing outward and, consequently, the belt face 24 is faced inward. A first segment of belt face 24 encircling the waist and situated inward is concealed from view, as are the measurement indicia present on the first segment of the belt face 24. The end 29 of belt 22 is first fed through buckle 28 and behind the locking bar 31, which is slidably attached to the buckle. The end 29 is then reversed in direction through the buckle 28 in front of the locking bar 31. The portion of belt 22 reversed through buckle 28 is designated herein as the second segment, and has its belt face 24 and corresponding measurement indicia located outward away from the waist due to the reversal in direction of belt 22. Consequently, the measurement indicia present on the second segment of first belt face 24 is exposed for viewing and recording. The buckle 28 and locking bar 31 provide infinite adjustment along the length of the belt 22. The vertical position of belt 22 is adjusted to occupy its proper position about the waist of the measured individual. Belt 22 is tightened or loosened to a desired comfort as instructed by the measured individual and/or as determined by the tailor.

The measured individual may adjust the height and tightness by himself or have another assist in locating belt 22 about his waist to match the intended location of the pants waistband with equal success. Since the buckle 28 secures the belt 22 once it is tightened, the belt remains stationary at the location selected by the individual because of the locking bar 31 of the belt buckle 28. As a result, the individual does not need to hold the belt in place either to obtain an accurate measurement or to judge the fit and feel of the waistband at the selected location. This feature further permits the individual to freely move with the belt attached to confirm that the location of the belt and tightness are going to be adequate and comfortable prior to recording the measurement.

A waist or circumferential measurement is then registered by reading the particular measurement indicia exposed (by reversing of belt 22) at buckle 28 and recording the measurement. The recording of this and other measurements described herein may comprise, for example, placing the measurement in written form, storing it in electronic form, such as on a computer or other electronic device, recording it orally on suitable media, such as a tape recorder, or any other recordation technique which permits the measurements to be recalled at a later time for tailoring of the garment.

Strap 32 may be mated with or unmated with belt 22 (via fastener 30) during waist measurement.

Leg Length/Skirt Length

Fastener 30 is engaged to attach strap end 34 to belt 22, and belt 22 is encircled about the measured individual, as described above at the desired location of the waistband. The sequence of these two steps is not restricted. That is, belt 22 may be placed about the waist prior or subsequent to engaging strap end 34 and belt 22 with one another via fastener 30. Belt 22 is situated or rotated about the waist to place strap 32 at a circumferential position coinciding with the side of the leg, as shown in FIG. 6. Strap 32 is extended along the length of the side of the leg, and the measurement is registered. It is preferred that the measured individual place his shoes on prior to registering the measurement so that pants leg length may be registered accurately.

Since the belt 22 is located and circling the measured individual at the desired location of the waistband of the individual, an extremely accurate measurement is obtained that precisely measures the outseam measurement of the individual from the location of the waistband in the custom garment rather than from the location of a standard tailor's waist measurement. Another factor contributing to the accuracy of the leg length measurement is the construction of the strap 32. As set forth above, the strap 32 may be constructed of the same material as the material of the finished custom garment or a simulation thereof. As a result, when obtaining the leg length measurement using the strap 32, the strap tends to drape in a way substantially similar to the outseam of the finished garment. It will be appreciated by one of skill in the art that the same technique as outlined above for obtaining the leg length can also be utilized to obtain the length of shorts or length of a skirt. In the case of a skirt, it may be further desired to obtain one or more additional measurements of the thigh of the individual using the belt 22 alone by circling one or both thighs at a predetermined location.

Overall Rise

Figure 7:
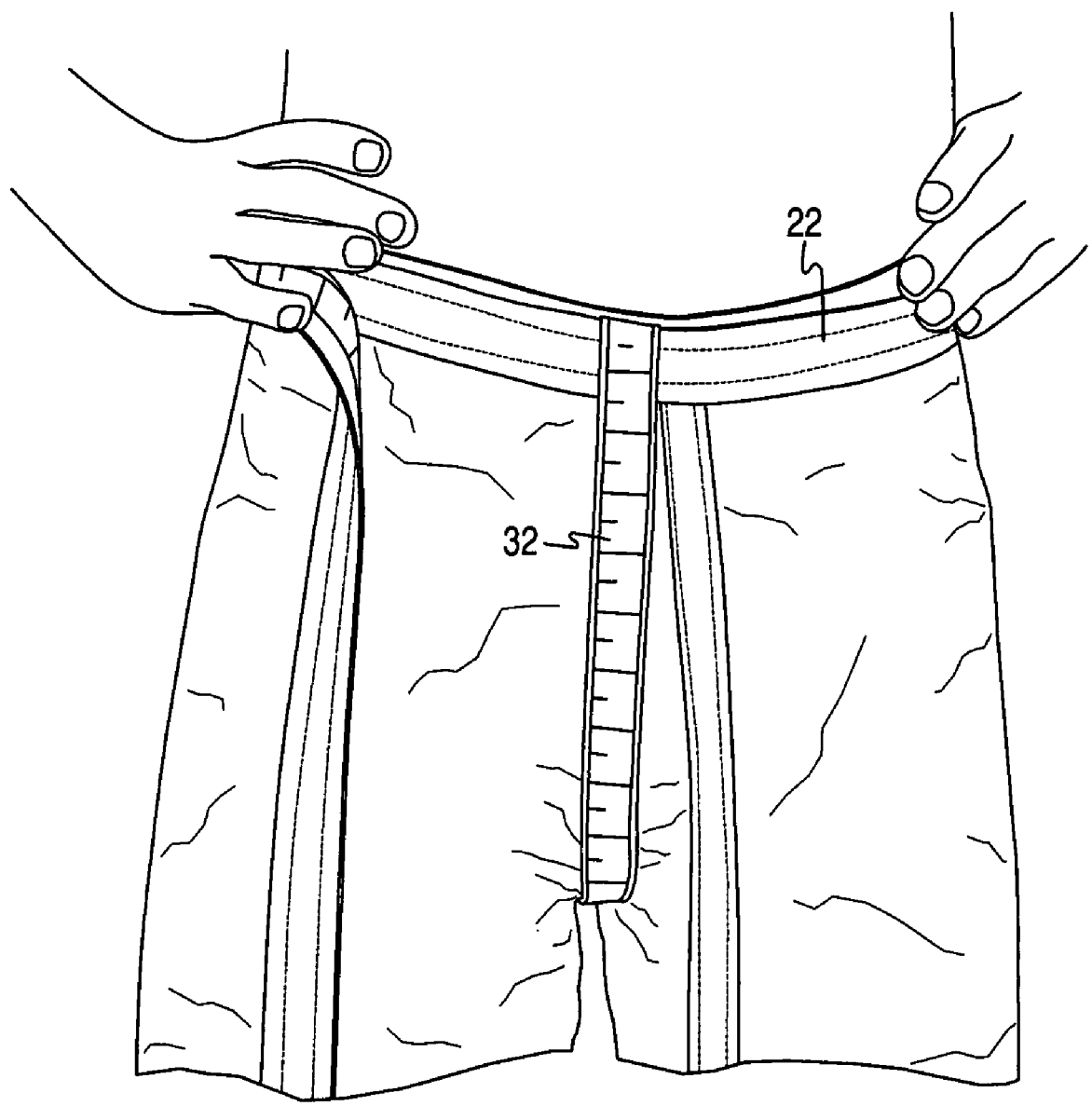
FIG. 7 is a depiction of the measuring device of FIG. 1 applied for taking an overall rise measurement.

As shown in FIG. 7, the overall rise is measured by placing belt 22 around the measured individual at the desired location of the waistband of the finished garment, as described above, and positioning fastener 30 at a circumferential position coinciding with the center of the back of the individual. In the event that overall rise is performed prior or subsequent to measuring pants leg length, belt 22 is simply rotated or revolved about the waist until fastener 30 is moved from the side of the leg to the center of the back, or vice versa.

Once belt 22 and strap 32 are properly positioned, strap 32 is pulled through the legs of the measured individual and raised to a circumferential position of belt 22 coinciding with the front center of the measured individual, as shown in FIG. 7. Overall rise is then registered as the measurement indicia of the scale 39 of strap 32 corresponding in location to upper edge 22a of belt 22.

Since strap 32 may be constructed of the same or substantially the same material as the finished garment and/or preferably has substantially the same dimensions of the crotch seam of that garment, accuracy of the overall rise measurement is enhanced. This is because the strap 32 as so constructed will approximates the feel and look of the ultimate crotch seam in the garment. Additionally, regardless of the material used for the strap 32, the measurement of the overall rise is taken from the desired location selected by the individual of the waistband of finished garment rather than some standard or traditional location.

Rear Rise

With belt 22 and strap 32 situated as shown in FIG. 7 and described above for measuring overall rise, the individual or other person marks strap 32 at the center of the measured individual's body, i.e., at the lowest point of strap 32. Marking may involve making a written notation on strap 32, or simply pinching strap 32. Fastener 30 is then disengaged to detach strap end 34 from belt 22, thereby permitting viewing of the marking, such as by removing strap 32 from between the individual's legs and raising the marking to eye level. The marking is then viewed and recorded for future use in preparation of the custom-tailored garment. These steps may be repeated to obtain multiple registrations and ensure accurate measurement.

Front Rise

Front rise may be calculated as the overall rise minus rear rise. Alternatively, front rise may be measured by rotating belt 22 about the waist to position fastener 30 at a circumferential position corresponding to the front center of the individual with the belt 22 at the desired location of the waistband of the finished garment. Strap 32 is then attached to belt 22 (if not already attached), fed through the legs of the individual, and passed upward to a circumferential position of belt 22 coinciding with the center rear of the measured individual. Strap 32 is pulled downward between the legs to create the desired rise elevation. Strap 32 is then marked at its lowest point, detached, and recorded similar to described above for measuring rear rise. It should be understood that measured overall rise and front rise may be used to calculate rear rise.

Buttocks/Thighs

The buttocks and thighs can be measured by encircling either strap 32 or belt 22, preferably detached from one another, around the widest part of the individual's buttocks and thighs, respectively.

It should be appreciated that the present invention permits all of the lower body measurements referred to above to be obtained using only the strap 32 and the belt 22 without a need for further devices or accessories. Additionally, all of these measurements can be obtained without detaching the strap 32 from the belt 22 and all but the buttocks and thigh measurements can be obtained without requiring loosening, removal or repositioning of the strap 32 from the belt 22. This further increases the accuracy of the waist length and rise measurement since the strap 22 is not moved vertically thereby ensuring that the rise and length measurements will be measured from the same waistband location.

Described below are methods for taking various measurements useful in tailoring custom-made upper body garments, such as jackets, dress shirts, T-shirts, hats, and accessories. These methods are representative and not necessarily exhaustive of the manner in which the embodied measuring device 20 may be used.

Chest/Bust and Lower Ribs

Either belt 22 or strap 32, preferably detached from one another, is encircled about the widest part of the chest of the measured individual, who preferably is in a standing position and holding in his or her breath. In the event that belt 22 is used, the graduated measurement indicia present on the first segment of belt 22 encircling the individual has face 24 directed inward and concealed from view. The end 29 of belt 22 is fed through buckle 28 and reversed in direction. The second segment of belt 22 fed through buckle 28 has the belt face 24 situated outward for viewing of measurement indicia present on the second segment of first belt face 24. Belt 22 is tightened or loosened to a comfortable fit for the individual. In this instance, the locking mechanism of the belt 22 may or may not be used. A chest circumferential measurement is registered by reading the particular measurement indicia exposed (by reversing of belt 22) at buckle 28 and recording the measurement. Since the belt 22 can be secured in position using the buckle 28, the individual does not need to hold it in place and may move freely. This aids in confirming accurate placement of the belt and that the fit is comfortable both while stationary and while moving.

Measurement of the torso in the lower rib area is then facilitated by sliding belt 22 or strap 32 downward to a height corresponding to the bottom of the rib cage, tightening belt 22 or strap 32 to a desired comfort, and registering a measurement, as described above. Alternatively, the lower rib torso area may be registered initially, and thereafter belt 22 is raised to measure the chest area.

Neck/Half-Shoulder/Half-Span

Figure 10:
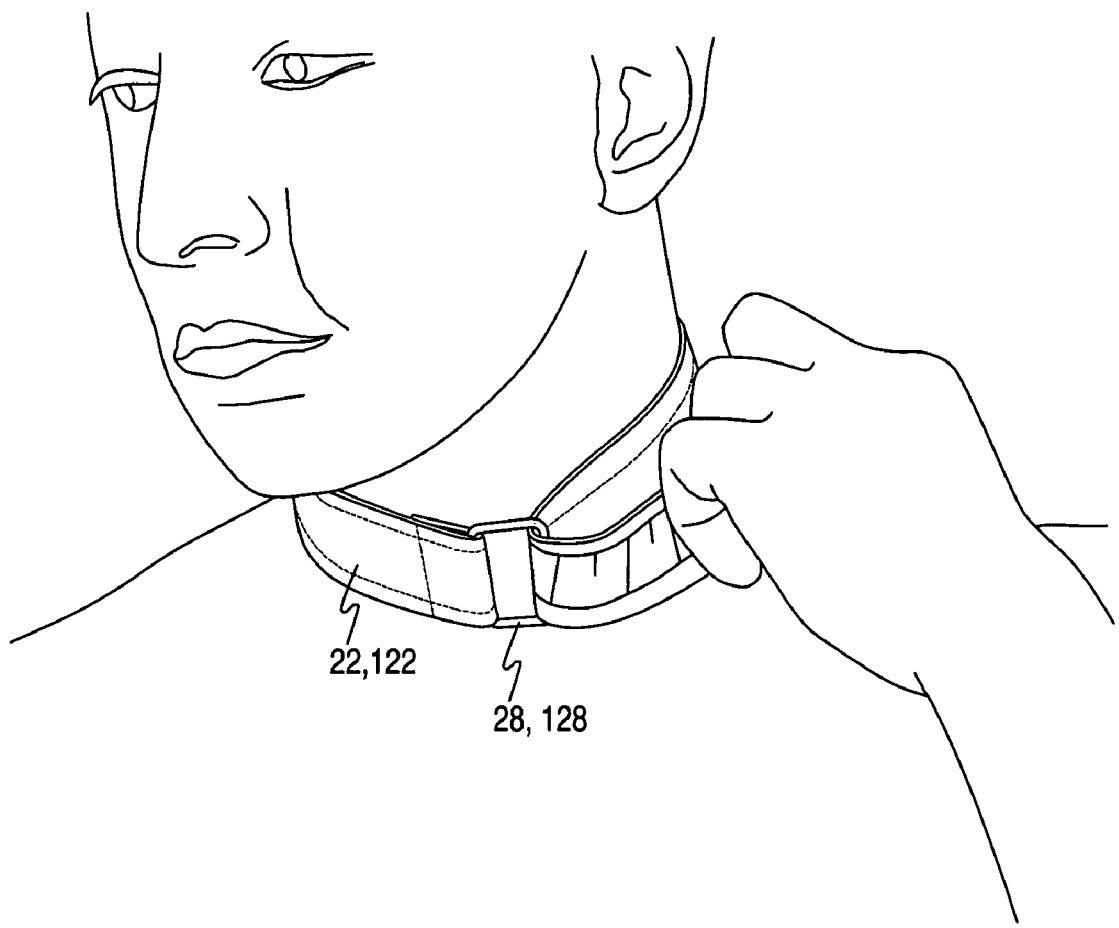
Figure 11:
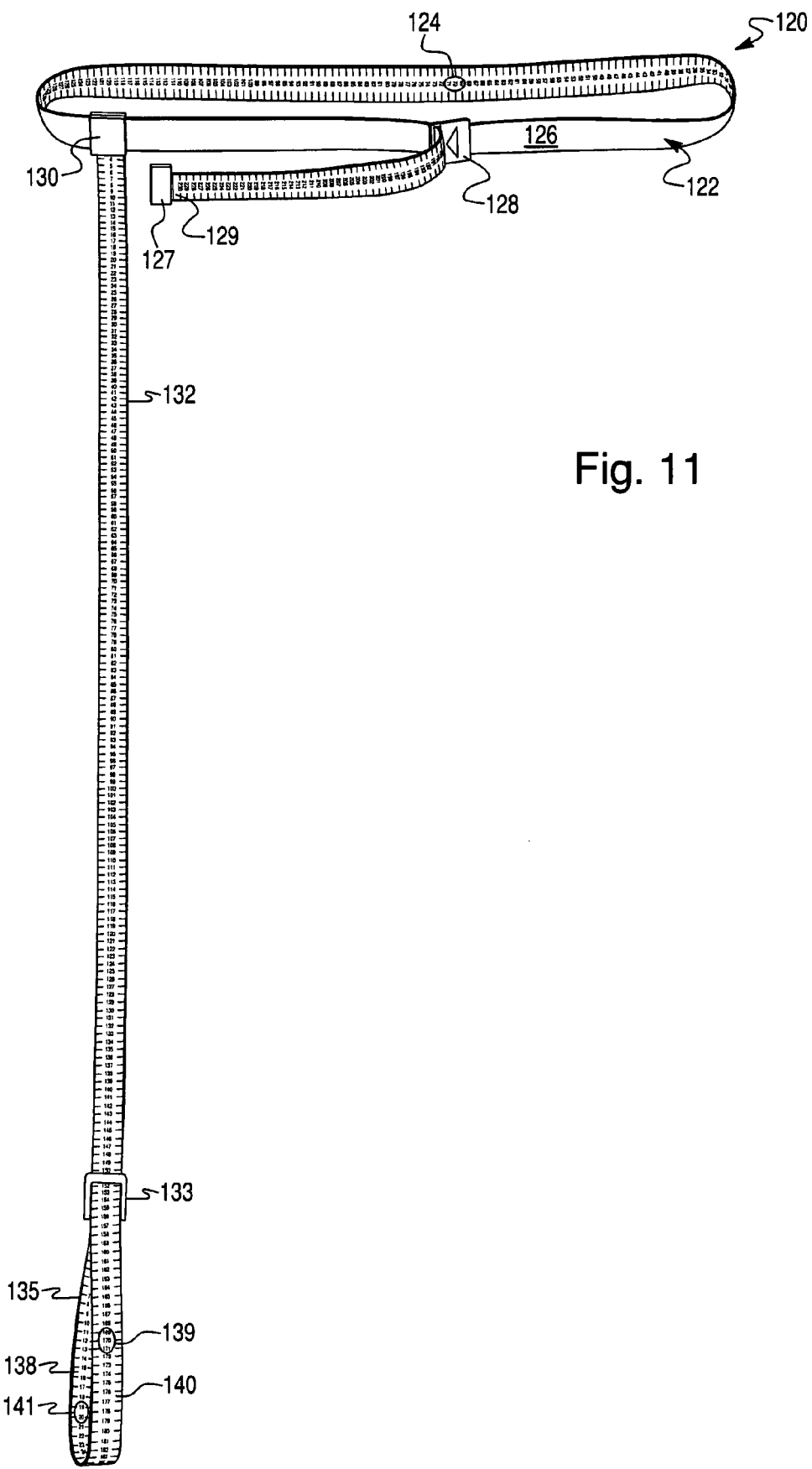
FIG. 11 is a top view of a measuring device according to another preferred embodiment of the invention.

As illustrated in FIG. 10, in order to measure neck size for a shirt, jacket or other garment, belt 22 is encircled around the neck of the measured individual at the same location a collar of a shirt or other garment would be situated, and a circumferential measurement is registered from the scale 23. Preferably, the graduated measurement indicia present on the first segment of belt 22 encircling the individual has face 24 directed inward towards the neck and hidden from view (so that half-snap of fastener 30 on belt 22 faces outward). The end 29 of belt 22 is fed through buckle 28 and reversed in direction. The second segment of belt 22 fed through buckle 28 has the belt face 24 thereof, is situated outward for viewing of the scale of measurement indicia of belt face 24. Belt 22 is tightened or loosened to a comfortable fit for the individual, and neck size is registered by reading and recording the particular measurement indicia exposed at buckle 28. The buckle 28 secures the belt in place without the need for additional support.

For measuring half-shoulder, fastener 30 is engaged to fixedly attach strap 32 along the length of belt 22, and belt 22 is encircled about the neck as described above. Attaching strap 32 to belt 22 in this manner prohibits the strap 32 from sliding along the length of the belt 22 while permitted full 360 degree rotation of the strap 32 in relation to the belt 22 about the point of the fastener 30. Fastener 30 may be engaged either prior or subsequent to encircling belt 22 about the neck. Belt 22 is rotated or revolved to position fastener 30 at a circumferential position corresponding to the vertebrae in the center rear of the neck. While retaining fastener 30 in place, strap 32 is extended along the slope of a first shoulder, and a first half-shoulder measurement is registered from the second scale since the strap 32 can be freely rotated about the fastener 30.

The device 20 can be used to accurately measure individuals of all different shoulder types (e.g., square shouldered or slope shouldered) from a fixed starting point without requiring removal or repositioning of the strap 32 from the belt 22. Another advantage provided by the rotatable strap 32 is that the risk of inaccurate measurement is eliminated due to inadvertent bending or folding of the strap to accommodate different shoulder structures.

Strap 32 is then rotationally pivoted about mated fastener 30 and extended along the slope of the opposite second shoulder, preferably while retaining the fastener 30 in place. Strap 32 is extended along the slope of the second shoulder, and the user registers a second half-shoulder measurement from the second scale of strap 32. Advantageously, the pivoting motion permitted by fastener 30 allows both shoulder spans to be measured from a common reference point without requiring removal and reattachment of the strap 32 to increase measurement accuracy. The rotatability of the strap 32 also permits accurate measurements even in the case where an individual might have a slightly different slope in opposing shoulders or a slightly asymmetrical upper back build.

Figure 9:
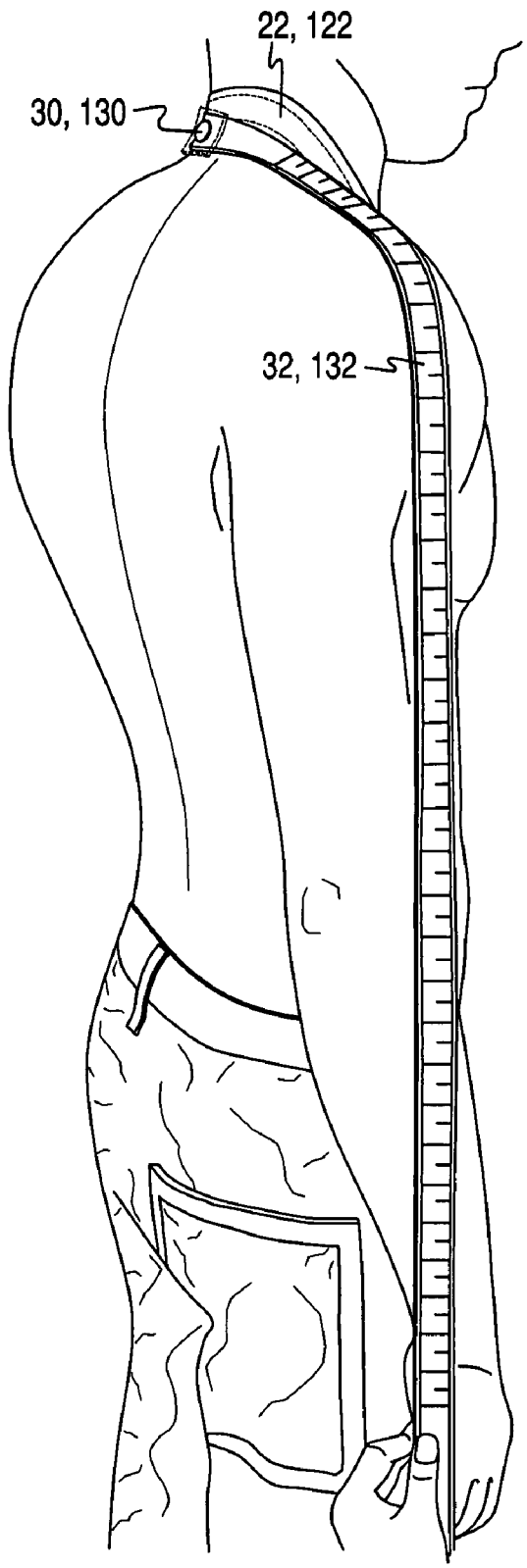
FIGS. 9 and 10 are depictions of the measuring device of FIG. 1 applied about the neck for taking upper body measurements.

The half-span is measured in substantially the same manner as half-shoulder, except that strap 32 is extended along extended arm to the hand, more preferably to the pinky knuckle, as shown in FIG. 9. All of the advantages set forth above with respect to the half shoulder measurement apply equally to the half span measurement as a result of the attachment of the strap 32 to the belt 22 in a manner that fixes it along the length of the belt while permitting full pivotal rotation of the strap 32. After registering a first half-span measurement, strap 32 is pivoted about fastener 30 as described above to register a second half-span measurement.

Vertical/Head/Bicep/Wrist

The vertical measurement is taken by placing an end of either belt 22 or strap 32, preferably disengaged from one another, at the knot of the Adams apple and measuring to the center of the belly button. Head, bicep, and wrist measurements are taken by encircling either belt 22 or strap 32, preferably disengaged from one another, about the head, bicep, and wrist, respectively.

Jacket

Figure 8:
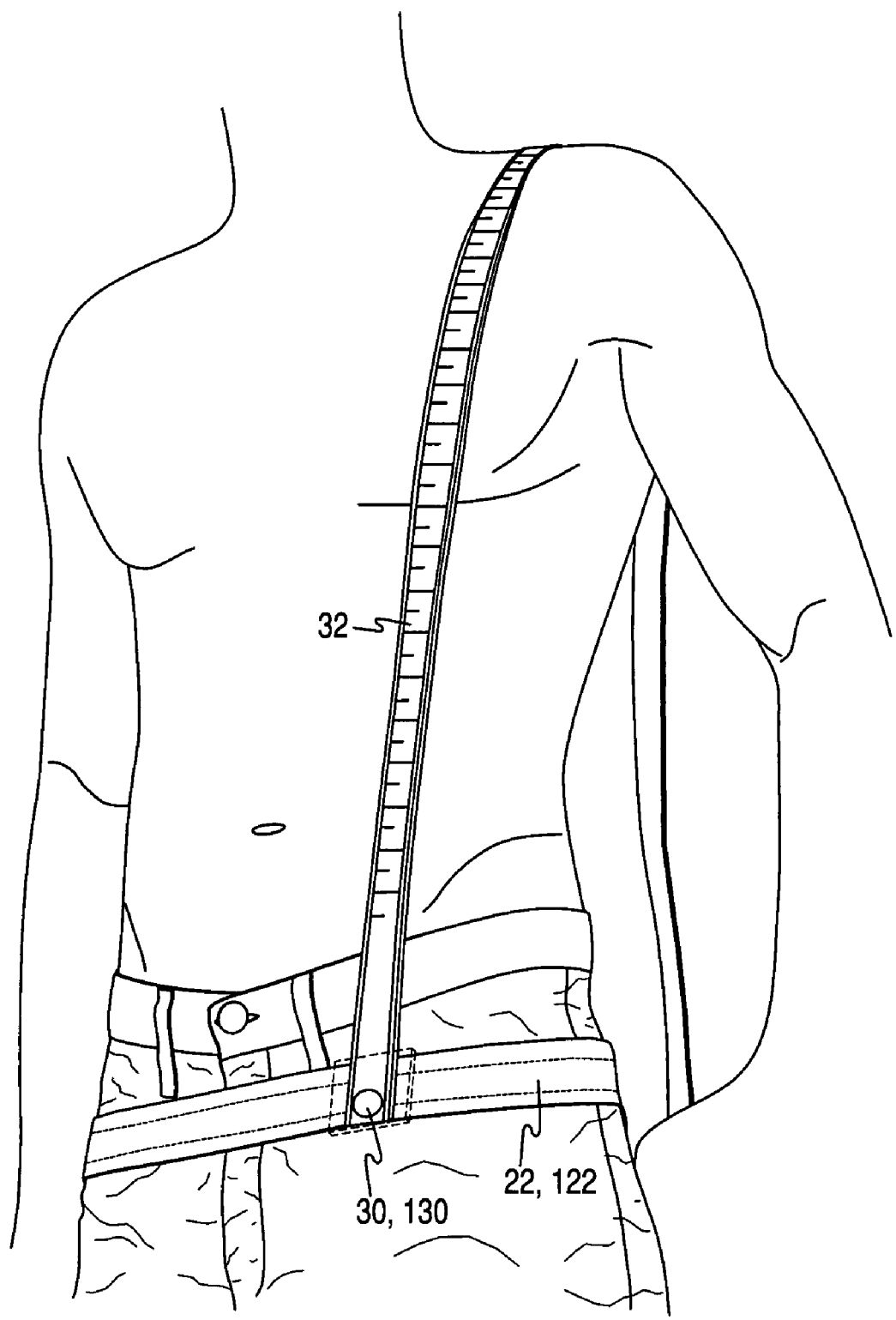
FIG. 8 is a depiction of the measuring device of FIG. 1 applied for taking a jacket measurement.

Turning to FIG. 8, belt 22 is encircled around the waist or hip area of the measured individual, and second end 29 of belt 22 is fed through buckle 28. Belt 22 is disposed at a height corresponding to the length of the jacket desired by the measured individual, so that edge 22a of belt 22 faces downward and coincides with the lower edge of the jacket. Fastener 30 is used to mate strap 32 with belt 22, either prior or subsequent to encircling of belt 22 about the individual's waist. While retaining belt 22 encircled about the waist or hips at the desired jacket length, strap 32 is extended up to and optionally over the shoulder of the individual, and a jacket measurement is registered from the edge 22a to the point of the shoulder using the scale 39 of strap face 40 for use in preparation of the custom-tailored jacket.

Utilizing the belt 22 to simulate the location of the bottom of a jacket yields several advantages. First, with the belt affixed to the individual, the individual is provided with both a visual and tactile representation of where the lower edge of the jacket will fall which can be selected by the individual based upon his or her particular preferences. Since the belt is affixed, the individual is permitted to move and turn in front of a mirror so as to judge whether the jacket length will be suitable both in the front and the back. The use of the device 20 in measuring an individual for a custom-fit jacket can also include taking additional measurements. For example, in addition to the measurement of the length and front panel of the jacket described above, the strap can be used in the configuration described and illustrated in FIG. 8 to obtain a back panel and overall panel measurement for the jacket. This is accomplished by taking the end of the strap 32 that is not attached to the belt and placing the opposing end of the strap 32 against the belt 22 on the bottom of belt 22 on the back side of the individual and recording this overall measurement.

This measurement provides not only an overall panel measurement from the bottom front edge of the belt 22 over the shoulder of the individual to the bottom of the back edge of the belt 22, but also a back panel measurement by subtracting the front panel measurement from the overall panel measurement. This measurement is particularly useful in obtaining a custom-fit jacket for individuals who are either large-busted or heavily muscled. As will be appreciated, if the fastener 30 is positioned on the back of the individual as opposed to the front as illustrated in FIG. 8, this measurement can be accomplished by the individual being measured without requiring the assistance of another.

The measuring device 20 of the present invention can provide accurate measurements for virtually any article of custom clothing by utilizing only a belt 22 and a strap 32 that are detachable from one another and reattachable to one another and permit rotational pivoting of the strap 32 in relation to the belt 22 at the point of the fastener 30.

Referring now more particularly to the drawings, a measuring device according to another preferred embodiment of the invention is generally referred to by reference numeral 120 in FIGS. 11 to 14.

Measuring device 120 comprises a belt 122 having a flexible belt body capable of being encircled about a body part of an individual, such as around a waist, neck, chest, arm, thigh, hip and/or head. The belt body has an inner face 124 and an opposite face 126 (See FIGS. 11 and 12). A buckle 128 is provided at one end of belt 122, and is sized to permit feeding of the opposite second end 129 of belt 122 through buckle or bracket 128. Attachment of buckle 128 to belt 122 may be accomplished in known manners, such as by folding over sewing excess belt length to create a loop securing buckle 128. In the preferred embodiment, however, the buckle 128 is molded directly onto one end of belt by known injection molding techniques. As discussed in further detail below, belt 122 further comprises a molded end piece or blocking member 127 at the opposite second end 129 such that the belt is formed as a continuous loop. The belt 122 passes through the aperture 128' in the buckle 128 and the molded end piece 127 is larger than the aperture 128' so that the opposite second end 129 cannot pass through the aperture 128'.

The inner face 124 has a first belt scale 123 of measurement indicia for providing circumference measurements. The first belt scale 123 may comprise a measuring tape, marking strip, etc. attached to, e.g., sewn into, the body of belt 122. Alternatively, the first scale may be embedded, integral with, marked on, or otherwise associated with the belt body. In the illustrated embodiment, the opposite face 126 of the belt body does not include a scale of measurement indicia but, instead, is provided with a logo, advertisement or other indicia. It should be understood, however, that it is within the scope of the invention to include a separate scale of measurement indicia on the face 126, and to make the scale of measurement indicia of the face 126 identical to or different from the indicia of the first scale on the inner face 124.

The first belt scale 123 is preferably a unique measurement scale of consecutively numbered marks spaced by a quarter inch. Alternatively, the inner scale may comprise a different scale or symbols, such as, for example, indicators for small, medium, large, extra large, or women's sizes (e.g., 2, 4, 6, etc.). These are just examples of measurement indicia that may be used. Preferably, the inner scale of measurement indicia employs the end of buckle 128 as a reference starting point for measuring distance along the belt 122.

Figure 12:
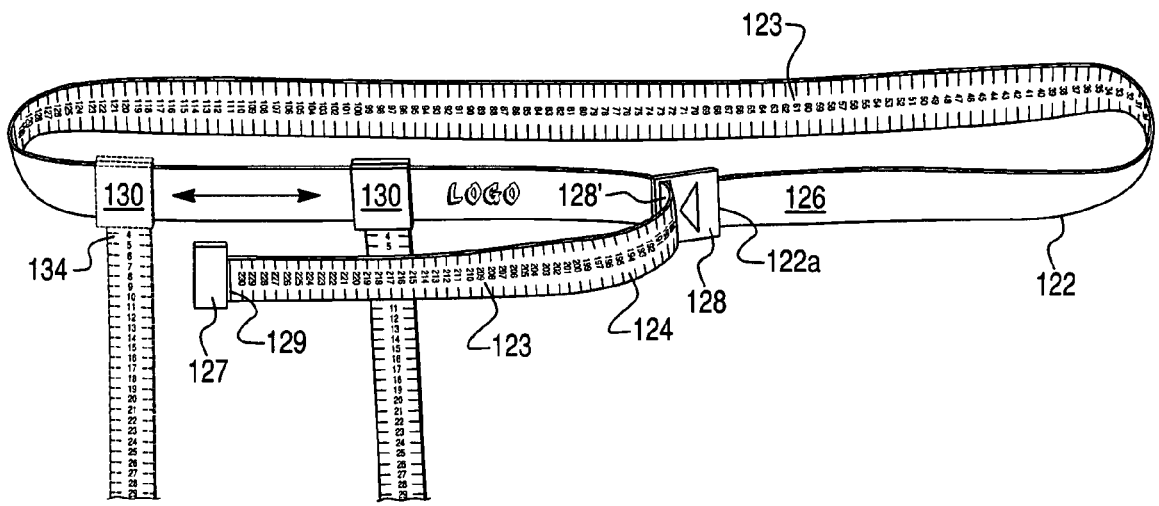
FIG. 12 is an enlargement of a portion of the view depicted in FIG. 11 showing the strap sliding relative to the belt via the fastener therebetween.
Figure 13:
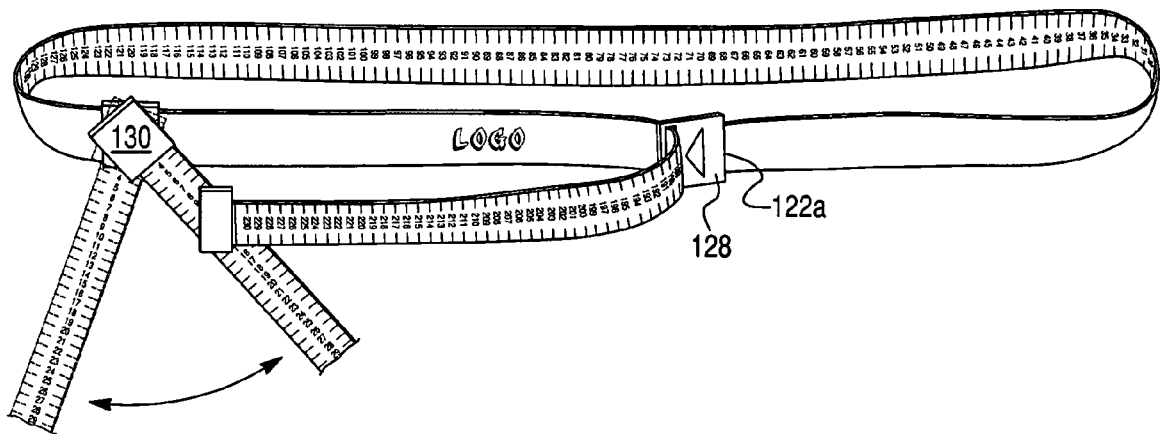
FIG. 13 is an enlargement of a portion of view of the measuring device of FIG. 11 showing the strap pivoting relative to the belt about the fastener therebetween.

Measuring device 120 further comprises a strap 132 having a strap end 134 secured to the belt body. The attachment is accomplished using fastener 130, which is illustrated as a molded member slidingly and rotatably disposed on the belt body 122, whereby the strap 132 is selectively connected to the belt body 122 through the fastener 130, i.e., a first half of the snap pair integrated into the fastener 132 and a second half of snap pair molded to the strap end 134. The snap pair fastener 130 fixes the connection between belt 122 and strap 132, inasmuch as fastener 130 render the attached strap end 134 slidable along the length of the belt 122. FIG. 12 illustrates the sliding capability of the strap 132 along the belt 122 with one (leftward) position shown in dotted line, and FIG. 13 illustrates the rotational capability of the strap 132 with respect to the belt 122. Because the axis of rotation of the fastener 130 is positioned at the centerline of the belt 122, the user achieves accurate measurements despite the rotational movement of the strap 132; i.e., from the same point on the centerline of the belt 122.

Accordingly, it should be understood that different types of relative movement between belt 122 and strap 132 are not necessarily restricted by fastener 130. For example, according to the preferred embodiment snap pair fastener 130 provides a pivot point at the centerline of the belt 122 for permitting strap 132 to pivot rotationally about its point of attachment to the belt 122. See FIG. 13. It should be understood that other types of fasteners may be used in addition to or in place of the depicted fastener 130. Fastener 130 is preferably repeatedly detachable from and re-attachable to belt 122 without damage to belt 122 or strap 132 to permit detachment and re-attachment of fastener from belt 122.

Fastener 130 provides additional advantages over prior known constructions. Prior constructions that attach a strap to a belt through a loop-type connection were prone to result in inaccurate measurements since, as the strap was tensioned, it would tend to bend or pull a section of the belt that was looped around out of alignment, for example, with the centerline of the belt. With the construction of the fastener 130 of the present invention, if undue tension is applied to the strap that might have a tendency to bend or move the belt 122 out of a true and accurate position or alignment, the fastener 130 can be designed to automatically uncouple the strap 132 from the belt 122 under a pre-selected amount of tension. Further, the rotational axis of the fastener is centered on the middle of the belt 122 to provide more accurate measurement.

Strap 132 has an inner face 138 and an opposite outer face 140. See FIG. 11. In the illustrated embodiment, in FIG. 11, outer face 140 features a second strap scale 139 of graduated measurement indicia. The attachment of strap end 134 to belt 122 as shown arranges the outer face 140, and hence the second strap scale 139, in an opposite direction (facing away) from the first scale 123 on inner face 124 of belt 122. In the illustrated and preferred embodiment, the inner face 138 of strap 132 includes a separate (third) scale 141 on the face 138. The third scale 141 is also a series of numbered marks spaced apart by a quarter inch; however, the numbered marks are in the opposite direction to the second strap scale 139 of outer face 140.

The second strap scale 139 is preferably the same as the belt scale 123. The strap scale is preferably a unique measurement scale of ¼ inches designated by consecutively numbered marks. Alternatively, the strap scale may comprise a different scale or symbols, as long as it enables sizes to be recorded in a way that will provide accurate guidance in the construction of garments for a particular individual, such as, for example, indicators for small, medium, large, extra large, or woman's sizes (e.g., 2, 4, 6, etc.). These are samplings of measurement indicia that may be used.

The second strap scale 139 may comprise a measuring tape or other strip sewn into, embedded, or otherwise integrated or otherwise associated with the body of strap 132. Preferably, the strap scale of measurement indicia measures distance from a reference starting point on the belt 122. Preferably, the reference starting point on the belt 122 is an edge 122*a* of belt 122 at the buckle 128. It should be understood that second scale need not include continuous markings from the reference starting point. Although the upper edge 122*a* may serve as the reference starting point of the second scale, an optional gap or omission of measurement indicia can be provided adjacent the reference starting point. For example, in the event that the graduated measurement indicia are set forth in inches, the lowest marked indicia on strap 132 may be, for example, 4 inches representative of a distance of 4 inches from upper edge 122*a*.

It will be understood that the third scale 141 measures distance from a reference starting point on the belt 122. Preferably, the reference starting point on the belt 122 for the third scale 141 is the opposite terminal end 135 when compared to the second scale 139 of belt 122.

Notably, the strap 132 is provided with a clasp 133 at the terminal end 135 whereby the strap 132 is threaded through the clasp or loop bracket 133 to create a second continuous loop out of the strap 132. The formation of the second continuous loop in the strap 132 enhances the measurement capability of the overall device since the second continuous loop pervades a simplified structure to measure various body parts such as the calf, thigh, triceps, biceps, wrist, neck, head. etc. See for example FIG. 14. Therefore, the preferred embodiment of the instant invention provides a unique dual loop structure where the belt 122 is formed as a first continuous (closed) loop with a first scale of measure 123 on at least one side and the strap 132 is also formed a second continuous (closed) loop having the second and third scales of measure 139, 141 on both sides 138, 140, respectively.

Described below are methods for taking various measurements useful in tailoring custom-made lower body garments, such as pants, jeans, shorts, jackets and skirts with the measurement device 120 illustrated in FIGS. 11-14. These methods are representative and not necessarily exhaustive of the manner in which the embodied measuring device 120 may be used for tailoring purposes.

Waist

Figure 14:
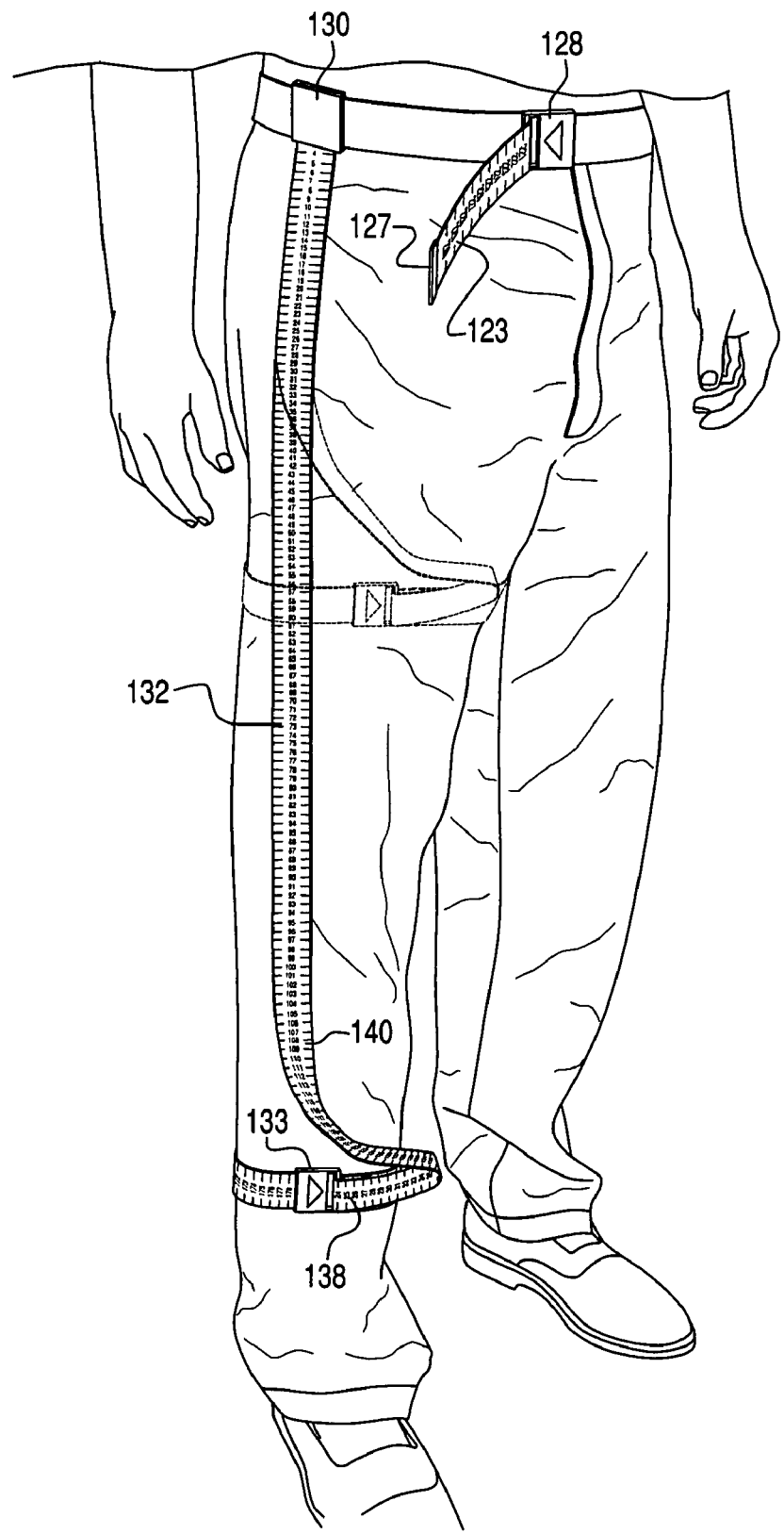
FIG. 14 is a depiction of the measuring device of FIG. 11 applied about the waist for taking waist, pants leg length measurements, calf measurement and thigh measurement.

The individual will preferably obtain the measurements using the device when dressed in underwear or a similar form-fitting garment to improve the accuracy of the measurements. To begin, the belt 124 is encircled about the measured individual at the desired vertical location of the waistband of the finished garment, as shown in FIGS. 6 and 14. Although this step may be performed by the tailor or the tailor's assistant, it is important to note that the measured individual may perform this task himself with equal success. The fastener 130 of belt 122 is arranged facing outward and, consequently, the belt face 124 is faced inward. A first segment of belt face 124 encircling the waist and situated inward is concealed from view, as are the measurement indicia present on the first segment of the belt face 24. The portion of belt 122 reversed through buckle 128 is designated herein as the second segment, and has its belt face 124 and corresponding measurement indicia located outward away from the waist due to the reversal in direction of belt 122. Consequently, the first scale 123 or measurement indicia present on the second segment of first belt face 124 is exposed for viewing and recording. The buckle 128 and molded end piece or blocking member 127 provides infinite adjustment along the length of the belt 122. The vertical position of belt 122 is adjusted to occupy its proper position about the waist of the measured individual. Belt 122 is tightened or loosened to a desired comfort as instructed by the measured individual and/or as determined by the tailor.

The measured individual may adjust the height and tightness by himself or have another assist in locating belt 122 about his waist to match the intended location of the pants waistband with equal success. Since the buckle 128 secures the belt 122 once it is tightened, the belt remains stationary at the location selected by the individual because of the locking bar 131 of the belt buckle 128. As a result, the individual does not need to hold the belt in place either to obtain an accurate measurement or to judge the fit and feel of the waistband at the selected location. This feature further permits the individual to freely move with the belt attached to confirm that the location of the belt and tightness are going to be adequate and comfortable prior to recording the measurement.

A waist or circumferential measurement is then registered by reading the particular measurement indicia exposed (by reversing of belt 122) at buckle 128 and recording the measurement. The recording of this and other measurements described herein may comprise, for example, placing the measurement in written form, storing it in electronic form, such as on a computer or other electronic device, recording it orally on suitable media, such as a tape recorder, or any other recordation technique which permits the measurements to be recalled at a later time for tailoring of the garment.

Strap 132 may be mated with or unmated with belt 122 (via fastener 130) during waist measurement.

Leg Length/Skirt Length

Fastener 130 is engaged to attach strap end 134 to belt 122, and belt 122 is encircled about the measured individual, as described above at the desired location of the waistband. The sequence of these two steps is not restricted. That is, belt 122 may be placed about the waist prior or subsequent to engaging strap end 134 and belt 122 with one another via fastener 130. Belt 122 is situated or rotated about the waist or the strap is slid along the belt 122 to locate the strap 132 at a circumferential position coinciding with the side of the leg, as shown in FIGS. 6 and 14. Strap 132 is extended along the length of the side of the leg, and the measurement is registered. It is preferred that the measured individual place his shoes on prior to registering the measurement so that pants leg length may be registered accurately.

It will be appreciated by one of skill in the art that the same technique as outlined above for obtaining the leg length can also be utilized to obtain the length of shorts or length of a skirt. In the case of a skirt, it may be further desired to obtain one or more additional measurements of the thigh of the individual using the belt 122 alone by circling one or both thighs at a predetermined location.

Overall Rise

As shown in FIG. 7, the overall rise is measured by placing belt 122 around the measured individual at the desired location of the waistband of the finished garment, as described above, and positioning fastener 130 at a circumferential position coinciding with the center of the back of the individual. In the event that overall rise is performed prior or subsequent to measuring pants leg length, belt 122 is simply rotated or revolved about the waist or the fastener 30 is slid along the belt 122 from the side of the leg to the center of the back, or vice versa.

Once belt 122 and strap 132 are properly positioned, strap 132 is pulled through the legs of the measured individual and raised to a circumferential position of belt 122 coinciding with the front center of the measured individual, as shown in FIG. 7. Overall rise is then registered as the measurement indicia of the second scale 139 of strap 132 corresponding in location to upper edge 122*a* of belt 122.

Rear Rise

With belt 122 and strap 132 situated as shown in FIG. 7 and described above for measuring overall rise, the individual or other person marks strap 132 at the center of the measured individual's body, i.e., at the lowest point of strap 132. Marking may involve making a written notation on strap 132, or simply pinching strap 132. Fastener 130 is then disengaged to detach strap end 134 from belt 122, thereby permitting viewing of the marking, such as by removing strap 132 from between the individual's legs and raising the marking to eye level. The marking is then viewed and recorded for future use in preparation of the custom-tailored garment. These steps may be repeated to obtain multiple registrations and ensure accurate measurement.

Front Rise

Front rise may be calculated as the overall rise minus rear rise. Alternatively, front rise may be measured by rotating belt 122 or sliding fastener 130 about the waist to position fastener 130 at a circumferential position corresponding to the front center of the individual with the belt 122 at the desired location of the waistband of the finished garment. Strap 132 is then attached to belt 122 (if not already attached), fed through the legs of the individual, and passed upward to a circumferential position of belt 122 coinciding with the center rear of the measured individual. Strap 132 is pulled downward between the legs to create the desired rise elevation. Strap 132 is then marked at its lowest point, detached, and recorded similar to described above for measuring rear rise. It should be understood that measured overall rise and front rise may be used to calculate rear rise.

Buttocks/Thighs

The buttocks and thighs can be measured by encircling either strap 132 or belt 122 around the widest part of the individual's buttocks and thighs, respectively.

It should be appreciated that the present invention permits all of the lower body measurements referred to above to be obtained using only the strap 132 and the belt 122 without a need for further devices or accessories. See FIG. 14. The second continuous loop of strap 132 and the two-sided scales of measure (scales 139, 141) provide the necessary tools to measure both leg length via the second scale 139 and the calf diameter via the second loop and the third scale 141 as shown in FIG. 14. Additionally, all of these measurements can be obtained without detaching the strap 132 from the belt 122 and the buttocks and thigh measurements can be obtained without requiring loosening, removal or repositioning of the strap 132 from the belt 122. This further increases the accuracy of the waist length and rise measurement since the strap 122 is not moved vertically thereby ensuring that the rise and length measurements will be measured from the same waistband location.

Described below are methods for taking various measurements useful in tailoring custom-made upper body garments, such as jackets, dress shirts, T-shirts, hats, and accessories. These methods are representative and not necessarily exhaustive of the manner in which the embodied measuring device 120 may be used.

Chest/Bust and Lower Ribs

Either belt 122 or strap 132 is encircled about the widest part of the chest of the measured individual, who preferably is in a standing position and holding in his or her breath. In the event that belt 122 is used, the graduated measurement indicia present on the first segment of belt 122 encircling the individual has face 124 directed inward and concealed from view. The second segment of belt 122 fed through buckle 128 has the belt face 124 situated outward for viewing of measurement indicia present on the second segment of first belt face 124. Belt 122 is tightened or loosened to a comfortable fit for the individual. In this instance, the locking mechanism of the belt 122 may or may not be used. A chest circumferential measurement is registered by reading the particular measurement indicia exposed (by reversing of belt 122) at buckle 128 and recording the measurement. Since the belt 122 can be secured in position using the buckle 128, the individual does not need to hold it in place and may move freely. This aids in confirming accurate placement of the belt and that the fit is comfortable both while stationary and while moving.

Measurement of the torso in the lower rib area is then facilitated by sliding belt 122 or strap 132 downward to a height corresponding to the bottom of the rib cage, tightening belt 122 or strap 132 to a desired comfort, and registering a measurement, as described above. Alternatively, the lower rib torso area may be registered initially, and thereafter belt 122 is raised to measure the chest area.

Neck/Half-Shoulder/Half-Span

As illustrated in FIG. 10, in order to measure neck size for a shirt, jacket or other garment, belt 122 or strap 132 is encircled around the neck of the measured individual at the same location a collar of a shirt or other garment would be situated, and a circumferential measurement is registered from the appropriate scale 123 or 139.

For measuring half-shoulder, fastener 130 is engaged to fixedly attach strap 132 along the length of belt 122, and belt 122 is encircled about the neck as described above. Fastener 130 may be engaged either prior or subsequent to encircling belt 122 about the neck. Fastener 130 is rotated or slid to position fastener 130 at a circumferential position corresponding to the vertebrae in the center rear of the neck. While retaining fastener 130 in place, strap 132 is extended along the slope of a first shoulder, and a first half-shoulder measurement is registered from the second scale since the strap 132 can be freely rotated about the fastener 130.

The device 120 can be used to accurately measure individuals of all different shoulder types (e.g., square shouldered or slope shouldered) from a fixed starting point without requiring removal or repositioning of the strap 132 from the belt 122. Another advantage provided by the rotatable and slidable strap 132 is that the risk of inaccurate measurement is eliminated due to inadvertent bending or folding of the strap to accommodate different shoulder structures.

Strap 132 is then rotationally pivoted about mated fastener 30 and extended along the slope of the opposite second shoulder, preferably while retaining the fastener 130 in place. Strap 132 is extended along the slope of the second shoulder, and the user registers a second half-shoulder measurement from the second scale of strap 132. Advantageously, the pivoting motion permitted by fastener 130 allows both shoulder spans to be measured from a common reference point without requiring removal and reattachment of the strap 132 to increase measurement accuracy. The rotatability of the strap 132 also permits accurate measurements even in the case where an individual might have a slightly different slope in opposing shoulders or a slightly asymmetrical upper back build.

The half-span is measured in substantially the same manner as half-shoulder, except that strap 132 is extended along extended arm to the hand, more preferably to the pinky knuckle, as shown in FIG. 9. All of the advantages set forth above with respect to the half shoulder measurement apply equally to the half span measurement as a result of the attachment of the strap 132 to the belt 122 in a manner that fixes it along the length of the belt while permitting full pivotal rotation of the strap 132. After registering a first half-span measurement, strap 132 is pivoted about fastener 130 as described above to register a second half-span measurement.

Vertical/Head/Bicep/Wrist

The vertical measurement is taken by placing an end of either belt 122 or strap 132 at the knot of the Adams apple and measuring to the center of the belly button. Head, bicep, and wrist measurements are taken by encircling either belt 122 or strap 132 about the head, bicep, and wrist, respectively.

Jacket

Turning to FIG. 8, belt 122 is encircled around the waist or hip area of the measured individual. Belt 122 is disposed at a height corresponding to the length of the jacket desired by the measured individual, so that edge 122a of belt 122 faces downward and coincides with the lower edge of the jacket. Fastener 130 is used to mate strap 132 with belt 122, either prior or subsequent to encircling of belt 122 about the individual's waist. While retaining belt 122 encircled about the waist or hips at the desired jacket length, strap 132 is extended up to and optionally over the shoulder of the individual, and a jacket measurement is registered from the edge 122a to the point of the shoulder using the second scale 139 of strap face 140 for use in preparation of the custom-tailored jacket.

Utilizing the belt 122 to simulate the location of the bottom of a jacket yields several advantages. First, with the belt affixed to the individual, the individual is provided with both a visual and tactile representation of where the lower edge of the jacket will fall which can be selected by the individual based upon his or her particular preferences. Since the belt is affixed, the individual is permitted to move and turn in front of a mirror so as to judge whether the jacket length will be suitable both in the front and the back. The use of the device 120 in measuring an individual for a custom-fit jacket can also include taking additional measurements. For example, in addition to the measurement of the length and front panel of the jacket described above, the strap can be used in the configuration described and illustrated in FIG. 8 to obtain a back panel and overall panel measurement for the jacket. This is accomplished by taking the end of the strap 132 that is not attached to the belt and placing the opposing end of the strap 132 against the belt 122 on the bottom of belt 122 on the back side of the individual and recording this overall measurement.

This measurement provides not only an overall panel measurement from the bottom front edge of the belt 122 over the shoulder of the individual to the bottom of the back edge of the belt 122, but also a back panel measurement by subtracting the front panel measurement from the overall panel measurement. This measurement is particularly useful in obtaining a custom-fit jacket for individuals who are either large-busted or heavily muscled. As will be appreciated, if the fastener 130 is positioned on the back of the individual as opposed to the front as illustrated in FIG. 8, this measurement can be accomplished by the individual being measured without requiring the assistance of another.

The foregoing detailed description of the certain preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A measurement device, comprising:
   a belt comprising a flexible belt body capable of being encircled about a body part of an individual, the belt body comprising first and second ends and opposite first and second belt faces, the first belt face comprising a first scale of measurement indicia for providing at least one of length and circumference measurements; and
   a strap having a strap end attached to the belt body and a distal end, the strap comprising a flexible strap body with opposite first and second strap faces, at least one of the first and second faces comprising a separate second scale of measurement indicia for providing at least one of length and circumference measurements,
   the first end of the belt comprising a bracket with an aperture through which the belt body passes to configure the belt body in a first closed loop, the second end comprising a locking member having a size that is larger than the aperture such that the second end cannot pass through the aperture, whereby the locking member prevents the belt from being reconfigured out of the first closed loop.

2. The measuring device according to claim 1, wherein the strap defines a second closed loop connected to the belt and remote from the first closed loop.

3. The measuring device according to claim 1, wherein the distal end of the strap comprises a loop bracket having an aperture through which the strap passes to form a second closed loop.

4. The measuring device according to claim 1, wherein the strap end comprises a first attachment bracket that is detachably affixed to a second attachment bracket fitted onto the belt.

5. The measuring device according to claim 4, wherein the second attachment bracket is slidingly disposed on the belt.

6. The measuring device according to claim 1, wherein the strap is attached to the belt to render the attached strap end non-movable along the length of the belt.

7. The measuring device according to claim 1, wherein the first strap face comprising the second scale of measurement indicia for providing length measurements from a reference point on the belt, the second strap face comprising a third scale of measurement indicia for providing circumference measurements.

8. The measuring device according to claim 7, wherein the second and third scales of measurement are arranged in opposite directions such that the second scale is arranged in an ascending order to measure length while the third scale is arranged in a descending order to measure circumference.

9. The measuring device according to claim 1, wherein the strap end is adapted to be repeatedly detachable from and re-attachable to the belt body.

10. The measuring device according to claim 1, further comprising a buckle, wherein the buckle comprises a self-locking mechanism constructed and arranged to provide infinite adjustment along the length of the belt.

11. A measurement device, comprising:
a strap comprising a flexible strap body capable of being encircled about a body part of an individual, the strap body comprising first and second ends and opposite first and second strap faces, the first strap face comprising a first scale of measurement indicia for providing length measurements; and
the first end of the strap comprising a bracket with an aperture through which the strap body passes to configure the strap body in a closed loop, the second end comprising a locking member having a size that is larger than the aperture such that the second end cannot pass through the aperture, whereby the locking member prevents the strap from being reconfigured out of the closed loop.

12. The measurement device according to claim 11, wherein the second strap face comprising a second scale of measurement indicia for providing circumference measurements.

13. The measuring device according to claim 12, wherein the first and second scales of measurement indicia are arranged in opposite directions such that the first scale is arranged in an ascending order while the second scale is arranged in a descending order.

* * * * *